United States Patent
Yamasaki et al.

(10) Patent No.: US 9,457,835 B2
(45) Date of Patent: Oct. 4, 2016

(54) DRIVE UNIT AND ELECTRIC POWER STEERING INCLUDING THE DRIVE UNIT

(71) Applicant: DENSO CORPORATION, Kariya, Aichi-pref. (JP)

(72) Inventors: Masashi Yamasaki, Obu (JP); Takeshi Sawada, Gifu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/812,757

(22) Filed: Jul. 29, 2015

(65) Prior Publication Data
US 2016/0036304 A1    Feb. 4, 2016

(30) Foreign Application Priority Data

Jul. 31, 2014   (JP) .................................. 2014-156475
Jun. 16, 2015   (JP) .................................. 2015-120860

(51) Int. Cl.
| | | |
|---|---|---|
| *H02K 11/00* | (2016.01) | |
| *B62D 5/04* | (2006.01) | |
| *H02K 5/16* | (2006.01) | |
| *H02K 5/22* | (2006.01) | |

(52) U.S. Cl.
CPC ........... *B62D 5/0412* (2013.01); *B62D 5/0406* (2013.01); *B62D 5/0463* (2013.01); *H02K 5/16* (2013.01); *H02K 5/225* (2013.01); *H02K 11/0015* (2013.01); *H02K 11/0073* (2013.01); *H02K 11/33* (2016.01)

(58) Field of Classification Search
CPC .... H02K 11/33; H02K 5/225; H02K 11/048; H02K 29/22; H02K 11/30

USPC ................... 310/64, 71, 68 R, 68 D
See application file for complete search history.

(56) References Cited

U.S. PATENT DOCUMENTS

| | | | | |
|---|---|---|---|---|
| 8,436,500 | B2 * | 5/2013 | Minato ................. | H02M 7/003 310/68 C |
| 2012/0286630 | A1 * | 11/2012 | Tomizawa ............. | H02K 11/33 310/68 D |
| 2013/0187517 | A1 * | 7/2013 | Asao ...................... | H02K 1/185 310/68 D |
| 2013/0249356 | A1 * | 9/2013 | Nakano .................... | H02K 5/24 310/68 D |

FOREIGN PATENT DOCUMENTS

JP          5001662 B2       8/2012

OTHER PUBLICATIONS

U.S. Appl. No. 14/812,415, filed Jul. 29, 2015, Yamasaki, et al.
(Continued)

*Primary Examiner* — Thanh Lam
(74) *Attorney, Agent, or Firm* — Knobbe, Martens, Olson & Bear, LLP

(57) ABSTRACT

A drive unit includes a rotating electric machine, a frame member, and a controller. The rotating electric machine has a stator that has a winding wound on the stator, a rotor disposed relative to the stator, and a shaft rotating together with the rotor. The frame member is disposed on one axial end of the rotating electric machine. The controller includes a substrate attached on one surface of the frame member facing away from the rotating electric machine, a heat generation element disposed on a heat generation element mounting surface of the substrate, the heat generation element mounting surface facing the frame member, and an electronic component disposed on an electronic component mounting surface of the substrate.

16 Claims, 23 Drawing Sheets

(56) References Cited

OTHER PUBLICATIONS

U.S. Appl. No. 14/812,886, filed Jul. 29, 2015, Yamasaki.
U.S. Appl. No. 14/812,866, filed Jul. 29, 2015, Kawata, et al.
U.S. Appl. No. 14/812,807, filed Jul. 29, 2015, Kawata, et al.
U.S. Appl. No. 14/812,769, filed Jul. 29, 2015, Kadoike, et al.
U.S. Appl. No. 14/812,730, filed Jul. 29, 2015, Yamanaka, et al.
U.S. Appl. No. 14/812,753, filed Jul. 29, 2015, Kabune.
U.S. Appl. No. 14/812,733, filed Jul. 29, 2015, Yamasaki, et al.
U.S. Appl. No. 14/812,767, filed Jul. 29, 2015, Hayashi.

* cited by examiner

DRIVE UNIT AND ELECTRIC POWER STEERING INCLUDING THE DRIVE UNIT

CROSS REFERENCE TO RELATED APPLICATION

The present application is based on and claims the benefit of priority of Japanese Patent Application No. 2014-156475, filed on Jul. 31, 2014, and No. 2015-120860, filed on Jun. 16, 2015, the disclosure of which are incorporated herein by reference.

TECHNICAL FIELD

The present disclosure generally relates to a drive unit and an electric power steering device including drive unit.

BACKGROUND INFORMATION

Conventionally, the electric power steering device is known to have an electric motor which outputs an assist torque to assist a steering operation of a steering wheel, which is under control of a motor controller, such as the one in a patent document, Japanese Patent No. 5001662 (Patent document 1).

In the electric motor disclosed in the patent document 1, the controller is provided on one axial end side of the motor. Also, a capacitor is disposed outside of a projection area of the motor, which defines an outline, or a silhouette, of the motor along the motor axis. Further, a connector for connecting a harness is disposed further outside of the capacitor. Therefore, due to such an arrangement of the capacitor and the connector, the radius volume of the motor measured along the radius increases.

SUMMARY

An aspect of the present disclosure is to provide a drive unit that has a smaller volume of the unit, and to provide an electric power steering device using such a drive unit.

In an aspect of the present disclosure, the drive unit includes a rotating electric machine, a frame member, and a controller.

The rotating electric machine has a stator, a rotor, and a shaft. The stator has a winding wound on the stator. The rotor is rotatably disposed relative to the stator. The shaft rotates together with the rotor.

The frame member is disposed on one axial end of the rotating electric machine.

The controller has a substrate, a heat generation element, and an electronic component. The substrate is attached on one surface of the frame member facing away from the rotating electric machine. The heat generation element is disposed a heat generation element mounting surface of the substrate that faces the frame member. The electronic component, which is taller than the heat generation element in terms of height on the substrate, is disposed on the other surface of the substrate, i.e., on the surface facing away from the frame member, or an electronic component mounting surface.

The connector is used for an electrical connection between the motor and an external device.

In the present disclosure, the heat generation element is enabled to dissipate heat to the frame member. That is, the frame member serves as an outline of the rotating electric machine, while also serving as a heat sink. Further, the heat generation element and the electronic component are arranged within the projection area of the cylinder part. In such manner, in comparison to provide a heat sink as a separate part that is separate from the frame member, the number of components in the drive unit is reduced, and the volume of the drive unit, especially along its axis, is reduced without increasing the volume along a radial direction of the drive unit.

Further, the electronic component, which is a relatively tall component in terms of height on the substrate, is disposed on the electronic component mounting surface, which is beneficial in terms of heat dissipation from the heat generation element to the frame member, since the heat generation element mounting surface is enabled to face the frame member.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, the drive unit in the present disclosure and the electric power steering are described with reference to the drawings.

First Embodiment

The drive unit in the first embodiment of the present disclosure and the electric power steering device are shown in FIGS. 1-13. Hereafter, in all embodiments described in the following, the same numerals represent the same parts, for the brevity of the description.

Figure 1:
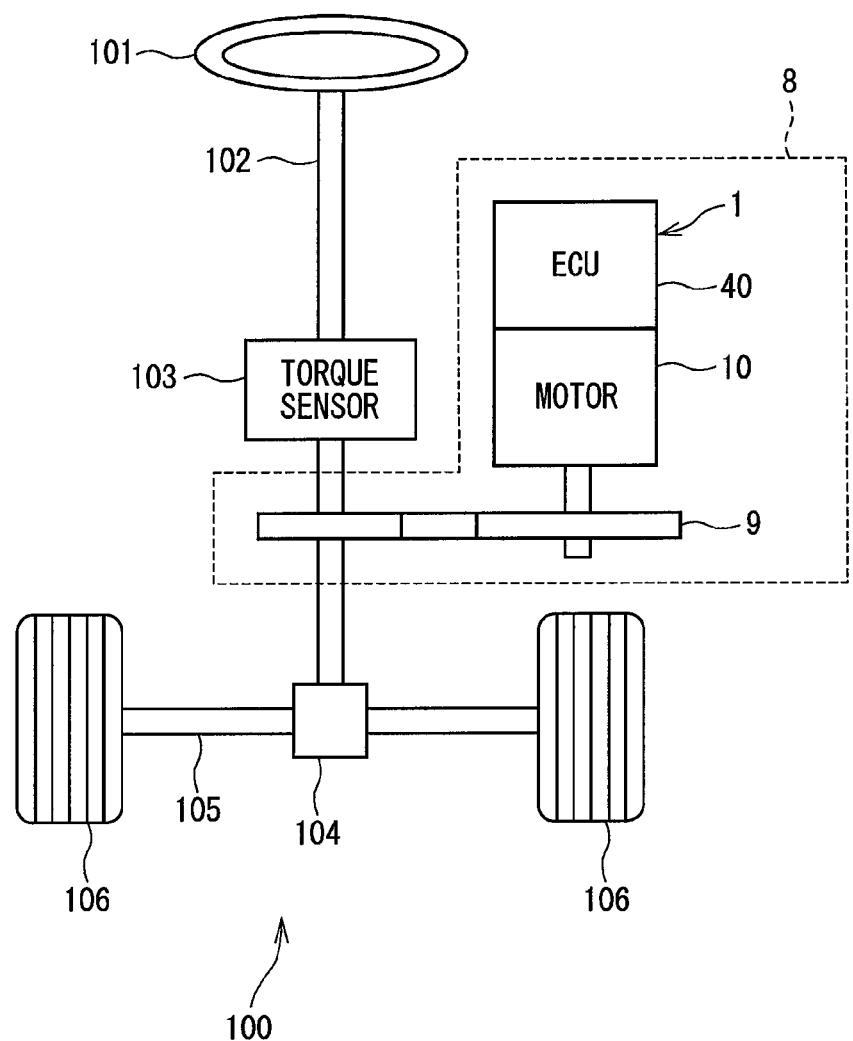
FIG. 1 is a system diagram of an electric power-steering in a first embodiment of the present disclosure.

As shown in FIG. 1, a drive unit 1 is applied to an electric power steering device 8 for assisting the steering operation by the driver. The drive unit 1 is a one-body combination of a motor 10 serving as a rotating electric machine and an ECU 40 serving as a controller for controlling the motor 10.

FIG. 1 shows a system diagram of a steering system 100 having the electric power steering device 8. The steering system 100 comprises a steering wheel 101, a column shaft 102, a pinion gear 104, a rack shaft 105, wheels 106, and the electric power steering device 8 etc. respectively serving as a component of the system.

The steering wheel 101 is connected to the column shaft 102. The column shaft 102 has a torque sensor 103 disposed thereon, which is used for detecting a steering torque which is input thereto when the driver operates the steering wheel 101. At a tip of the column shaft 102, the pinion gear 104 is disposed, which is engaged with the rack shaft 105. On both ends of the rack shaft 105, a pair of wheels 106 are disposed via a tie rod and the like.

Thereby, when the driver rotates the steering wheel 101, the column shaft 102 connected to the steering wheel 101 rotates. The rotational movement of the column shaft 102 is turned into a translational movement of the rack shaft 105 by the pinion gear 104, and the pair of wheels 106 are steered by an angle according to an amount of displacement of the rack shaft 105.

The electric power steering device 8 is provided with a speed reduction gear 9, which serves as a power transmission mechanism, and the drive unit 1. The electric power steering device 8 outputs the assisting torque from the motor 10 based on the signals from the torque sensor 103 and the vehicle speed obtained from a Control Area Network (CAN) which is not illustrated, and transmits the torque to the column shaft 102 via the speed reduction gear 9, for assisting the steering operation of the steering wheel 101. That is, the electric power steering device 8 of the present embodiment is what is designated as a "column assistance" type, which assists a rotation of the column shaft 102 with the torque generated by the motor 10. However, the device 8 may also be used as a "rack assistance" type, which assists the drive of the rack shaft 105. In other words, the column shaft 102 serving as "a drive object" in the present embodiment may be replaced with other objects, e.g., with the rack shaft 105.

Figure 2:
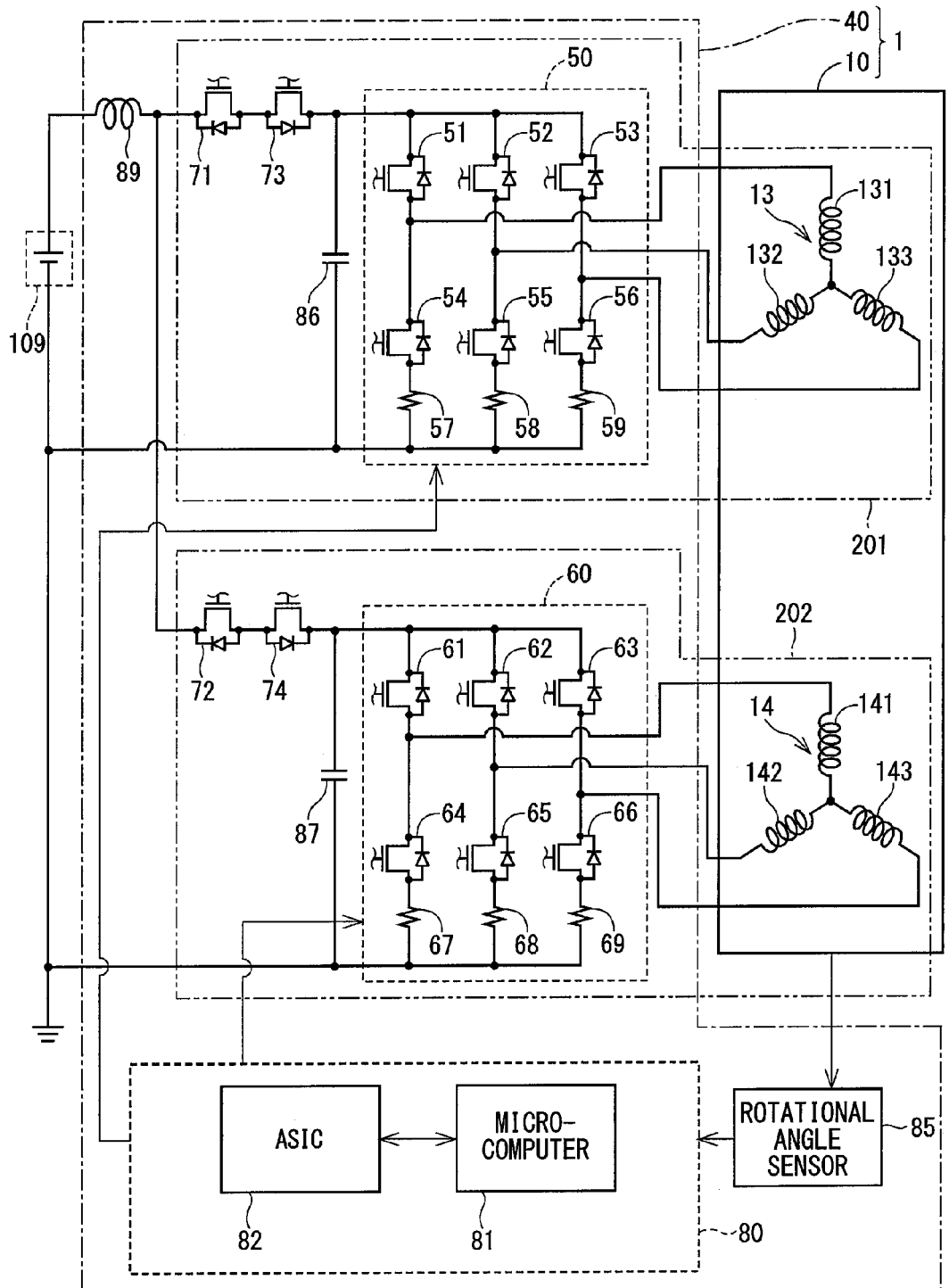
FIG. 2 is a schematic diagram of a circuit configuration of a drive unit in the first embodiment of the present disclosure.

Next, the electrical configuration of the electric power steering device 8 is described based on FIG. 2. In FIG. 2, for the readability of the drawing, some control lines etc. are omitted therefrom.

The motor 10 is a three-phase brushless motor, and has a first winding group 13 and a second winding group 14 respectively wound on to stator 12 which are mentioned later.

The first winding group 13 comprises a U phase coil 131, a V phase coil 132, and a W phase coil 133. The second winding group 14 comprises a U phase coil 141, a V phase coil 142, and a W phase coil 143.

According to the present embodiment, the first winding group 13 and the second winding group 14 respectively correspond to a "winding" in the claims.

The ECU 40 is provided with a first inverter part 50, a second inverter part 60, power relays 71, 72, reverse connection protection relays 73 and 74, a control unit 80, a rotational angle sensor 85, capacitors 86 and 87, and a choke coil 89 serving as a coil member, which are respectively mounted on a substrate 41 mentioned below. In the present embodiment, the electronic components which constitute the ECU 40 are mounted on one substrate 41. In such configuration, the number of components on the ECU 40 is reduced in comparison to a case where plural substrates 41 are used, thereby reducing the volume of the ECU 40.

The first inverter part 50 has six switching elements (SW elements) 51-56 combined in a bridge connection form, for the switching of the power supply to the first winding group 13. The second inverter part 60 has six SW elements 61-66 in a bridge connection form, for the switching of the power supply to the second winding group 14.

Although the SW elements 51-56, 61-66 of the present embodiment are Metal Oxide Semiconductor Field Effect Transistor, (MOSFET) other elements such as Insulated-Gate Bipolar Transistor (IGBT) and the like may also be used. In the present embodiment, the SW elements 51-56, 61-66 are equivalent to a "driver element."

As for the SW elements 51, 52, and 53 arranged on the high potential side of the first inverter part 50, the drain is connected to a positive electrode of a battery 109 that serves as a power supply, and the source is connected to the drain of the SW elements 54, 55, and 56 arranged on the low potential side.

The source of the SW elements 54, 55, and 56 is connected to a negative electrode of the battery 109 via current detection elements 57, 58, and 59. The junction points between the SW elements 51, 52, 53 on the high potential side and the SW elements 54, 55, 56 on the low potential side are connected to the U phase coil 131, the V phase coil 132, and the W phase coil 133, respectively.

As for the SW elements 61, 62, and 63 arranged on the high potential side of the second inverter part 60, the drain is connected to the positive electrode of the battery 109, and the source is connected to the drain of the SW elements 64, 65, and 66 arranged on the low potential side.

The source of the SW elements 64, 65, 66 is connected to the negative electrode of the battery 109 via current detection elements 67, 68, and 69. The junction points between the SW elements 61, 62, 63 on the high potential side and the SW elements 64, 65, 66 on the low potential side are connected to the U phase coil 141, the V phase coil 142, and the W phase coil 143, respectively.

The current detection elements 57, 58, and 59 are disposed on the low potential side of the SW elements 54-56 respectively corresponding to the three phases of the first winding group 13, for detecting the electric current in each of the three phases of the first winding group 13.

The current detection elements 67, 68, and 69 are disposed on the low potential side of the SW elements 64-66 respectively corresponding to the three phases of the second winding group 14, for detecting the electric current in each of the three phases of the second winding group 14.

The current detection elements 57-59, 67-69 of the present embodiment are implemented as shunt resistors.

The power relay 71 is disposed at a position between the battery 109 and the first inverter part 50, and conducts or intercepts the electric current between the battery 109 and the first inverter part 50.

The power relay 72 is disposed at a position between the battery 109 and the second inverter part 60, and conducts or intercepts the electric current between the battery 109 and the second inverter part 60.

The reverse connection protection relay 73 is disposed at a position between the power relay 71 and the first inverter part 50. The reverse connection protection relay 74 is disposed at a position between the power relay 72 and the second inverter part 60.

The reverse connection protection relays 73 and 74 prevent the electric current flowing in a reverse direction for the protection of the ECU 40, e.g., in the case when the battery 109 is connected in reverse, by having a parasitic diode connected in reverse relative to the power relays 71, 72.

In the present embodiment, the power relays 71, 72 and the reverse connection protection relays 73, 74 are all MOSFETS. However, other semiconductor elements such as IGBT and the like may also be used as those relays. In the present embodiment, the power relays 71, 72 and the reverse connection protection relays 73, 74 are respectively implemented as a semiconductor relay, and correspond to a "relay."

The control unit 80 has a microcomputer 81 and an Application Specific Integrated Circuit (ASIC 82) together with other parts, which are integrated circuit components.

The microcomputer 81 calculates an instruction value concerning the power supply to the first winding group 13 and the second winding group 14 based on the signal from the torque sensor 103 or the rotational angle sensor 85 and the like.

The ASIC 82 comprises a pre-driver, a signal amplifier, a regulator, and the like. The pre-driver generates a driving signal based on the instruction value, and outputs the generated driving signal to the first inverter part 50 and to the second inverter part 60. More practically, the pre-driver outputs the generated driving signal to the gate of the SW elements 51-56, 61-66. By the switching operation of the SW elements 51-56, 61-66 according to the driving signal, an AC current according to the instruction value is supplied to the first winding group 13 and to the second winding group 14 from the first inverter part 50 and the second inverter part 60, respectively. Thereby, the motor 10 is driven.

The signal amplifier amplifies the detection signal (i.e., a voltage between both terminals in the present embodiment) of the current detection elements 57-59, 67-69, and the detection value of the rotational angle sensor 85, and outputs them to the microcomputer 81. Further, the regulator is a stabilization circuit which stabilizes the voltage supplied to the microcomputer 81 and the like.

The rotational angle sensor 85 is constituted by a magnetism detection element, and detects a rotation angle of a rotor 15 by detecting a rotating magnetic field from a magnet 18 provided on an other end 162 of a shaft 16 mentioned later.

The capacitor 86 is connected in parallel with the first inverter part 50. The capacitor 87 is connected in parallel with the second inverter part 60. In the present embodiment, the capacitors 86 and 87 are the aluminum electrolytic capacitors, and are disposed on the inverter side (i.e., on one side close to the inverter parts 50, 60) of the relays 71-74. The choke coil 89 is connected at a position between the battery 109 and the positive electrodes of the capacitors 86 and 87. In the present embodiment, the choke coil 89 is disposed on the battery side (i.e., on one side close to the battery 109) of the relays 71-74.

The capacitors 86 and 87 and the choke coil 89 serve as a filter circuit, reducing the noise transmitted from the drive unit 1 to the other devices that share the power supply from the battery 109 with the drive unit 1, and also reducing the noise transmitted from the other devices back to the drive unit 1 sharing the battery 109. The capacitors 86 and 87 store the electric charge, and support the electric power supply to the first inverter part 50 and the second inverter part 60.

In the present embodiment, the first inverter part 50, the power relay 71, the reverse connection protection relay 73, and the capacitor 86 are grouped as a first system 201, corresponding to the first winding group 13. Further, the second inverter part 60, the power relay 72, the reverse connection protection relay 74, and the capacitor 87 are grouped as a second system 202, corresponding to the second winding group 14. That is, a drive control of the motor 10 is performed in plural systems, i.e., in two systems in the present embodiment.

Figure 3:
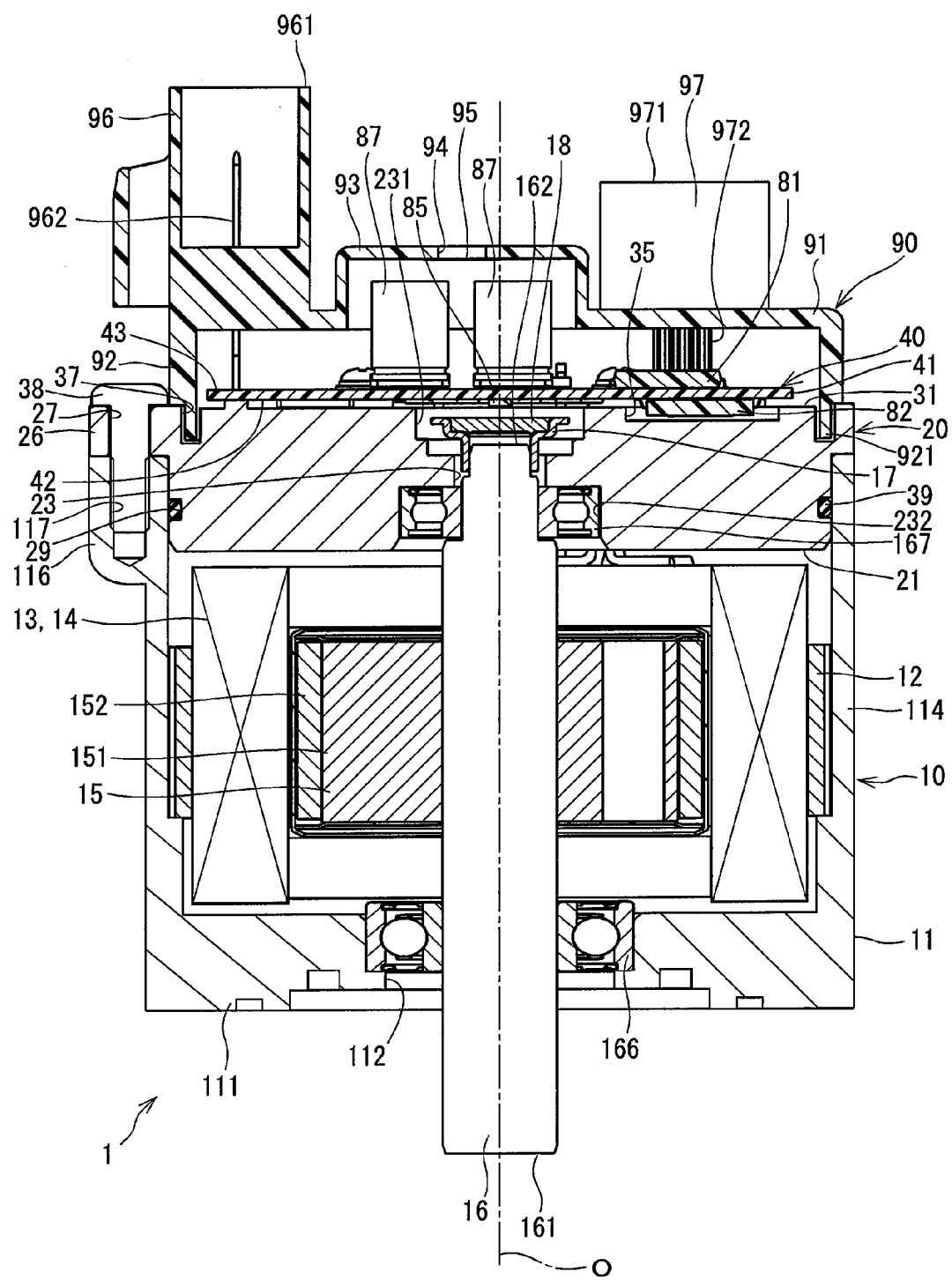
FIG. 3 is a sectional view of the drive unit in the first embodiment of the present disclosure.
Figure 4:
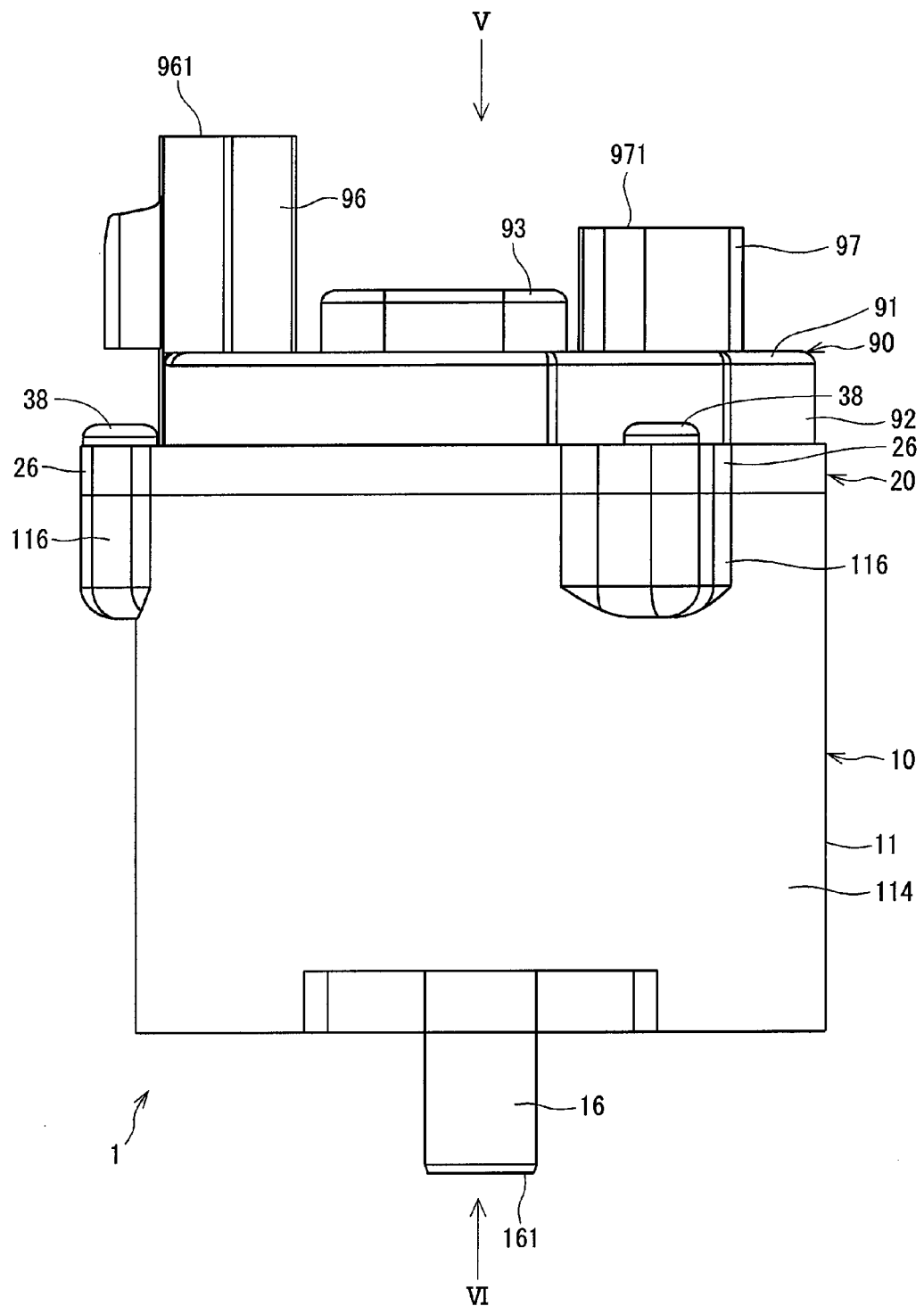
FIG. 4 is a side view of the drive unit in the first embodiment of the present disclosure.
Figure 5:
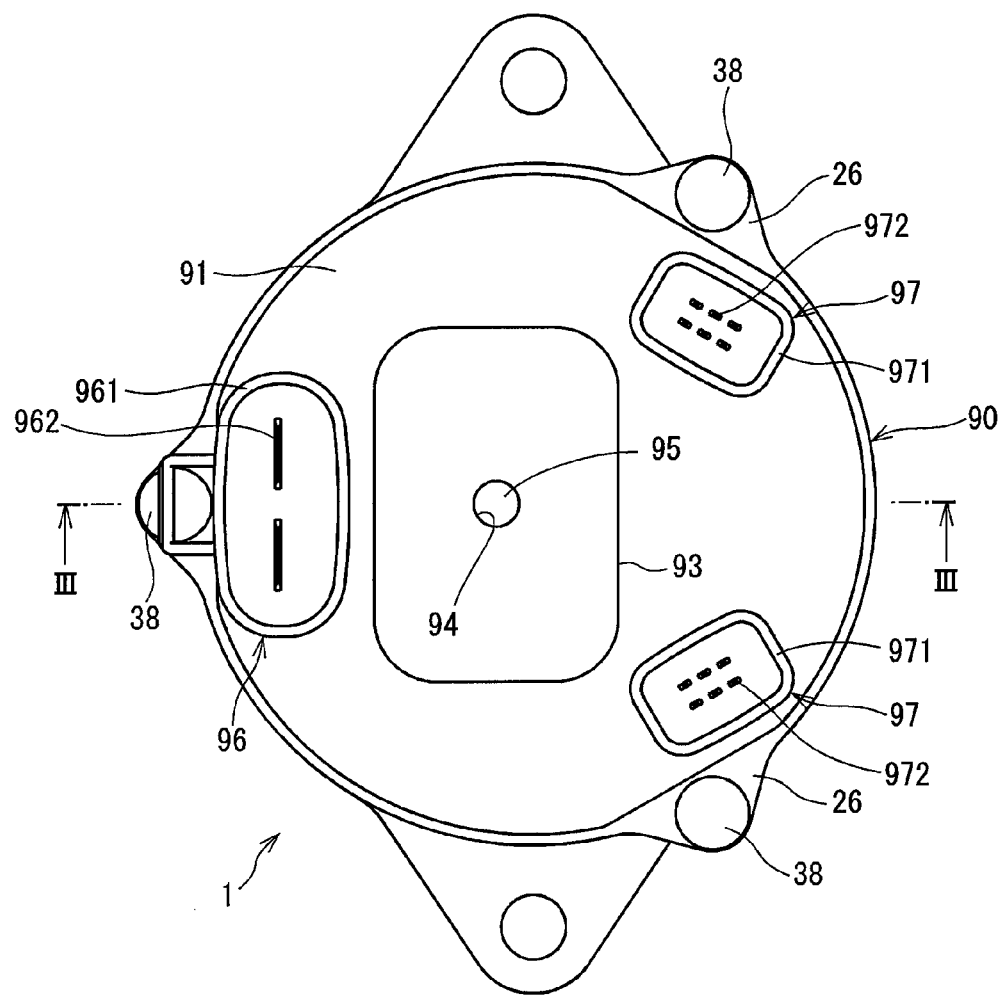
FIG. 5 is a top view of the drive unit along an arrow V in FIG. 4.
Figure 6:
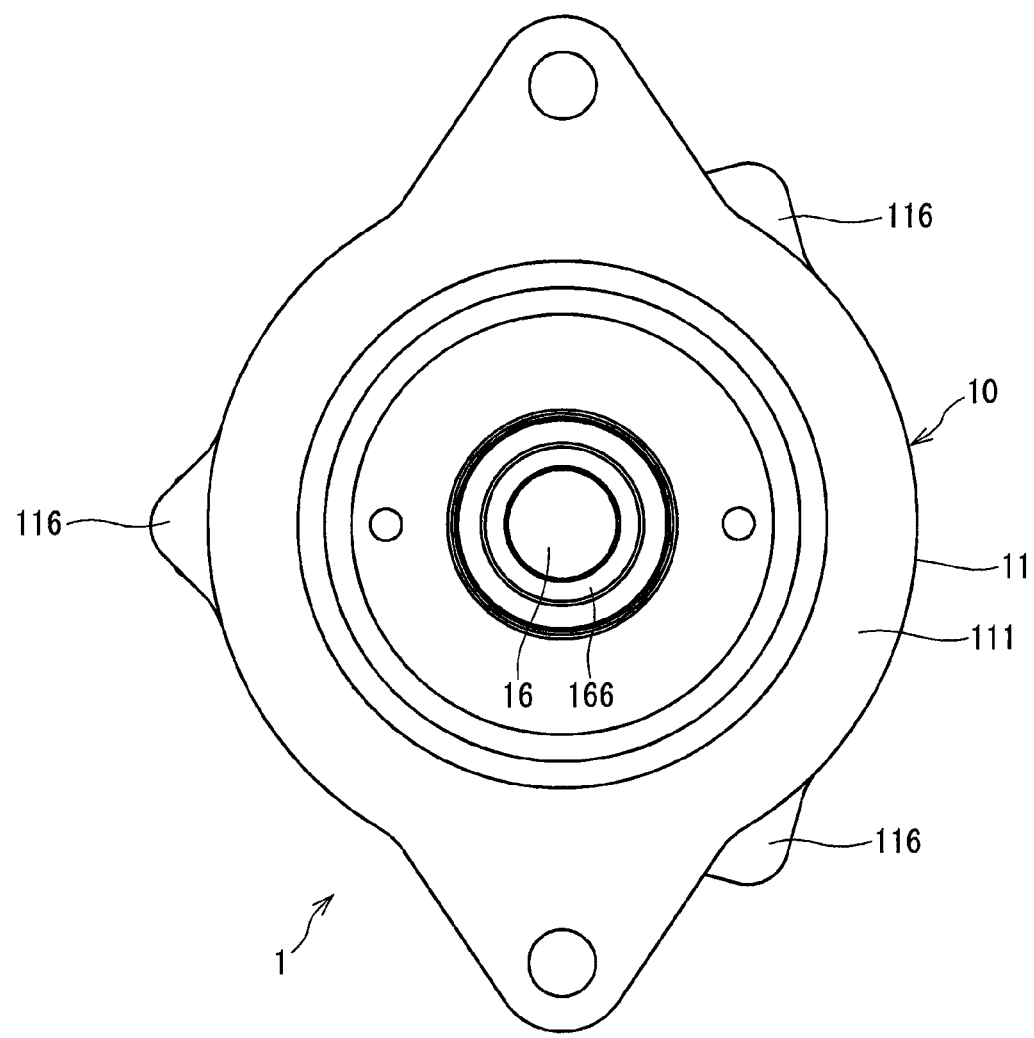
FIG. 6 is a bottom view of the drive unit along an arrow VI in FIG. 4.

Next, a structure of the drive unit 1 is described based on FIGS. 3-11. In the following, an axial direction of the motor 10 may simply be designated as an "axial direction," and a radius direction of the motor 10 may simply be designated as a "radius direction." FIG. 3 is a sectional view along a line of FIG. 5.

As shown in FIGS. 3-8, the drive unit 1 is provided with the motor 10, a frame member 20, the ECU 40, and connectors 96, 97.

As shown in FIG. 3, the motor 10 has a motor case 11, a stator 12, the first winding group 13, the second winding group 14, the rotor 15, the shaft 16 and other parts.

The motor case 11 serves as an outline of the motor 10, and has a bottom part 111 and a cylinder part 114, for example, is formed in a cylinder shape closed on one end, i.e., having a bottom on one end, and is made from metal, such as aluminum. The bottom part 111 may be considered as an outline of the one axial end side of the motor 10, and the cylinder part 114 may be considered as an outline along the radial direction of the motor. The motor case 11 of the present embodiment is made from aluminum, and, as for the surface of the case 11, the anodized aluminum treatment is performed. The bottom part 111 of the motor case 11 is positioned away from the ECU 40, i.e., on an opposite side, and an opening of the motor case 11 is close to the ECU 40, i.e., on the ECU side. In the present embodiment, the cylinder part 114 corresponds to a "cylinder part of the rotating electric machine serving as an outline" in the claims, and a projection area of the cylinder part 114 along the axial direction corresponds to a "motor region."

A shaft hole 112 into which one end 161 of the shaft 16 is inserted is disposed substantially at the center of the bottom part 111. Further, a bearing 166 is fitted to the bottom part 111.

The cylinder part 114 is disposed on an outer periphery of the stator 12, which is a radial outside of the cylinder part. By "radial outside," it is meant to be outside of a radius from a described part to a center axis O of the motor 16. On an opening of the cylinder part 114, a fixing tab 116 for fixedly disposing the frame member 20 is provided in a radially-protruding manner. The fixing tab 116 has a screw hole 117 bored thereon. In the present embodiment, the fixing tab 116 is provided at three positions at an equal interval.

The stator 12 has a layered part, i.e., a layered structure of a magnetizable thin metal such as iron, and an insulator disposed on a radial outside of the layered part, and the stator 12 is fixedly disposed in an inside of the motor case 11. The number of sheets of the thin metal in the layered part of the stator 12 may be changed according to the output required for the motor 10. Thereby, the output of the motor 10 can be changed by changing the axial length of the stator 12, without changing the radius length of the motor 10.

The first winding group 13 and the second winding group 14 are wound on the insulator of the stator 12. For each of the three phases, a first motor line 135 is taken out from the first winding group 13, and for each of the three phases, a second motor line 145 is taken out from the second winding group 14. The motor lines 135 and 145 are taken out, i.e., extend, from the motor case 11 toward the ECU 40 (see FIG. 7).

The first motor line 135 includes a first U phase motor line 136 and a first V phase motor line 137 and a first W phase motor line 138, and the three lines 136, 137, 138 are positioned away in a numeral ascending order from the power relays 71 and 72.

The second motor line 145 includes a second U phase motor line 146 and a second V phase motor line 147 and a second W phase motor line 148, and the three lines 146, 147, 148 are positioned away in a numeral descending order from the power relays 71 and 72.

The first U phase motor line 136 and the second U phase motor line 146, and the first V phase motor line 137 and the second V phase motor line 147, and the first W phase motor line 138 and the second W phase motor line 148 are respectively arranged at point-symmetric positions around the center axis O of the motor 10 mentioned later. Further, the first U phase motor line 136 and the first W phase motor line 138 are symmetric against the first V phase motor line 137. Similarly, the second U phase motor line 146 and the second W phase motor line 148 are symmetrically positioned against the second V phase motor line 147.

Thereby, the magnetic flux leakage from the first motor line 135 and the magnetic flux leakage from second the motor line 145 cancel with each other. Further, the influence of the magnetic flux leakage on the rotational angle sensor 85 that is mounted at a position on the center axis O of the motor 10 is reduced in such configuration, thereby reducing the detection error of the sensor 85.

Here, "symmetry" means a substantially-symmetric arrangement of those lines, for the cancellation of the magnetic flux leakage, allowing a dimension error in the actual product.

The rotor 15 has a rotor core 151 and a permanent magnet 152. The rotor core 151 is formed in an approximately cylindrical shape, for example, and is made from a magnetic material, e.g. iron, and is coaxially arranged in an inside of the stator 12, i.e., in a radius inside of the stator 12.

The permanent magnet 152 is disposed on a radius outside of the rotor core 151, and the N poles and the S poles of the rotor core 151 alternate with each other.

The shaft 16 is formed in a rod shape, for example, with metal, and is fitted at the center position, i.e., on a rotation axis of the rotor core 151. The shaft 16 is rotatably supported by the bearing 166 fitted on the bottom part 111 of the motor case 11 and is also rotatably supported by a bearing 167 fitted on the frame member 20. Thereby, the shaft 16 is rotatable with the rotor 15. Further, an outer wall of the rotor 15 and an inner wall of the stator 12 are interposed with an air gap.

The one end 161 of the shaft 16 is inserted into the shaft hole 112 that is bored on the bottom part 111 of the motor case 11, and projects toward an outside of the motor case 11. The one end 161 of the shaft 16 serves as an output end, which is connected to the speed reduction gear 9, for outputting the torque from the motor 10 toward the column shaft 102 via the speed reduction gear 9 (see FIG. 1), even though a connection between the output end and the speed reduction gear 9 is not explicitly illustrated.

The other end 162 of the shaft 16 has a magnet holder part 17 that holds the magnet 18.

Figure 7:
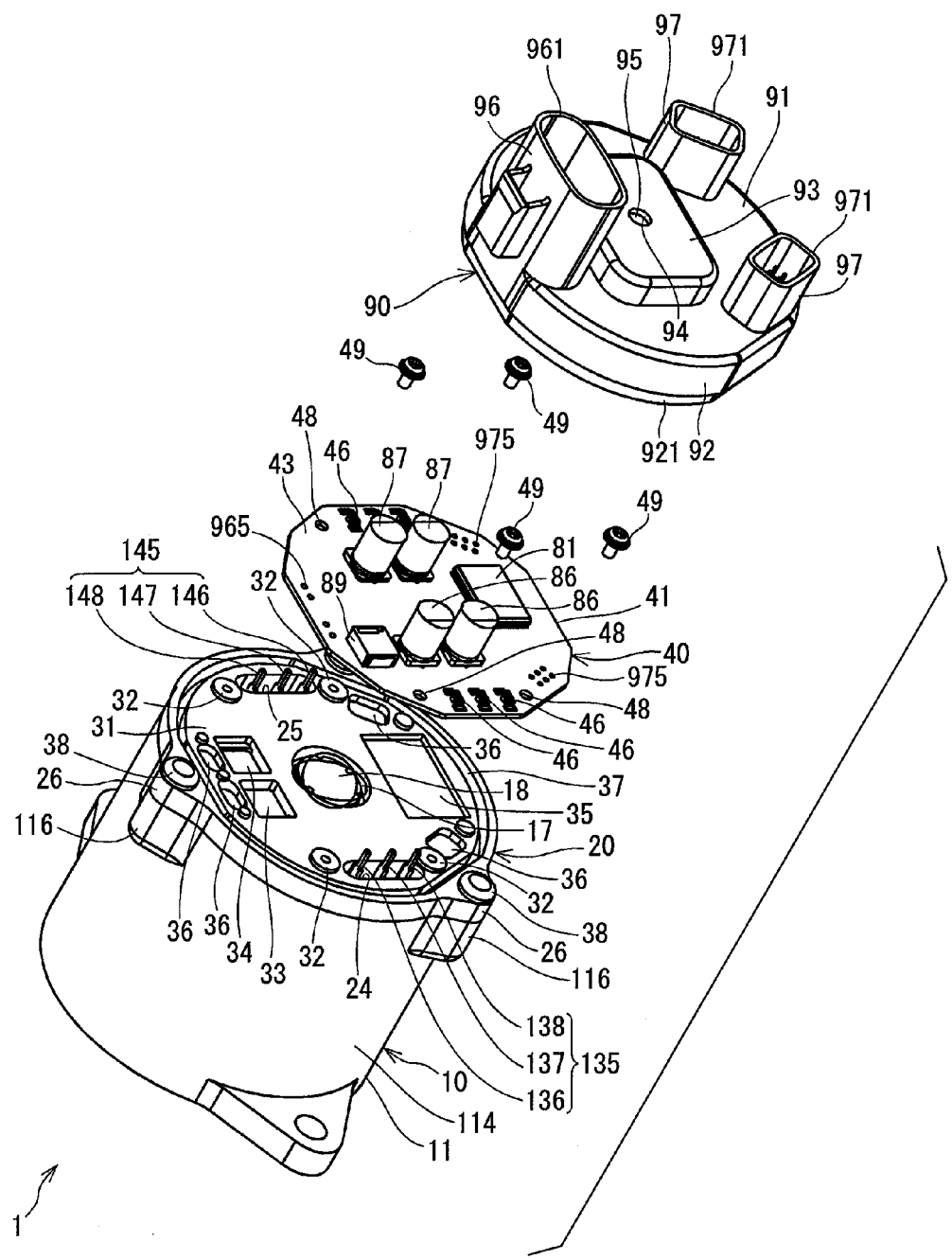
FIG. 7 is an exploded perspective view of the drive unit in the first embodiment of the present disclosure.

As shown in FIG. 3 and FIG. 7, for example, the frame member 20 made from highly-heat-conductive metal, such as aluminum or the like, is formed in a lid shape for closing the opening of the motor case 11, i.e., is inserted into a radial inside of the cylinder part 114. Here, one side of the frame member 20 close to the motor 10 is designated as a motor side face 21, and the other side of the frame member 20 away from the motor 10 and close to the ECU 40 is designated as an ECU side face 31.

A shaft hole 23 is bored substantially at the center of the frame member 20. The other end 162 of the shaft 16 is inserted into the shaft hole 23. Further, the frame member 20 has a magnet room 231 disposed thereon, which communicates with the shaft hole 23 and has an opening that opens toward the ECU 40. The magnet room 231 accommodates the magnet 18. Thereby, the magnet 18 disposed on the other end 162 of the shaft 16 is exposed to, i.e., faces, the ECU 40. Further, the frame member 20 has a bearing support part 232 formed thereon. The bearing 167 is fitted to the bearing support part 232 on the frame member 20.

Further, the frame member 20 has a motor line insertion hole 24 into which the motor line 135 is inserted and a motor line insertion hole 25 into which the motor line 145 is inserted. Thereby, the motor lines 135 and 145 are taken out therefrom to extend toward the ECU 40.

The frame member 20 has a fixing tab 26 which projects outward in a radius direction at corresponding positions (i.e., three positions in the present embodiment) corresponding to the fixing tab 116 of the motor case 11. The fixing tab 26 has a through hole 27 bored thereon. A frame lockscrew 38 is inserted into the through hole 27, and is tightly screwed into the screw-threaded hole 117. Thereby, the frame member 20 is fixed onto the motor case 11.

At an outer periphery of the frame member 20 and around the motor side face 21 which is close to the bottom part 111 than the fixing tab 26, an O ring groove 29 is provided, into which an O ring 39 is fitted, and the O ring 39 bound by the O ring groove 29 and the cylinder part 114 provides a watertight structure. Thereby, water and the like are prevented from intruding into the motor 10 via a position between the motor case 11 and the frame member 20.

The ECU side face 31 of the frame member 20 has a substrate fixing tab 32, relay rooms 33 and 34, an ASIC room 35, a terminal receptacle groove 36, and an adhesion groove 37.

As shown in FIGS. 3, 7-11, the ECU 40 is disposed away from the motor 10 relative to the frame member 20, i.e., with the frame member 20 interposed therebetween. The ECU 40 is positioned substantially within the motor region, and is substantially coaxially disposed with the motor 10.

The ECU 40 has the substrate 41 on which many electronic components are mounted.

The substrate 41 is formed in a shape that fits in the motor region. In the present embodiment, more practically, the substrate 41 is contained within the groove region, i.e., in a radius inside of the adhesion groove 37 provided on the ECU side face 31 of the frame member 20. In other words, the ECU components on the substrate 41, such as the SW elements 51-56, 61-66, the current detection elements 57-59, 67-69, the relays 71-74, the microcomputer 81, the ASIC 82, the rotation angle sensor 85, the capacitors 86, 87, and the choke coil 89, are positioned within the motor region.

Here, one side of the substrate 41 close to the motor 10 is designated as a heat generation element mounting surface 42, and the other side, a surface away from the motor 10, is designated as an electronic component mounting surface 43.

Figure 8:
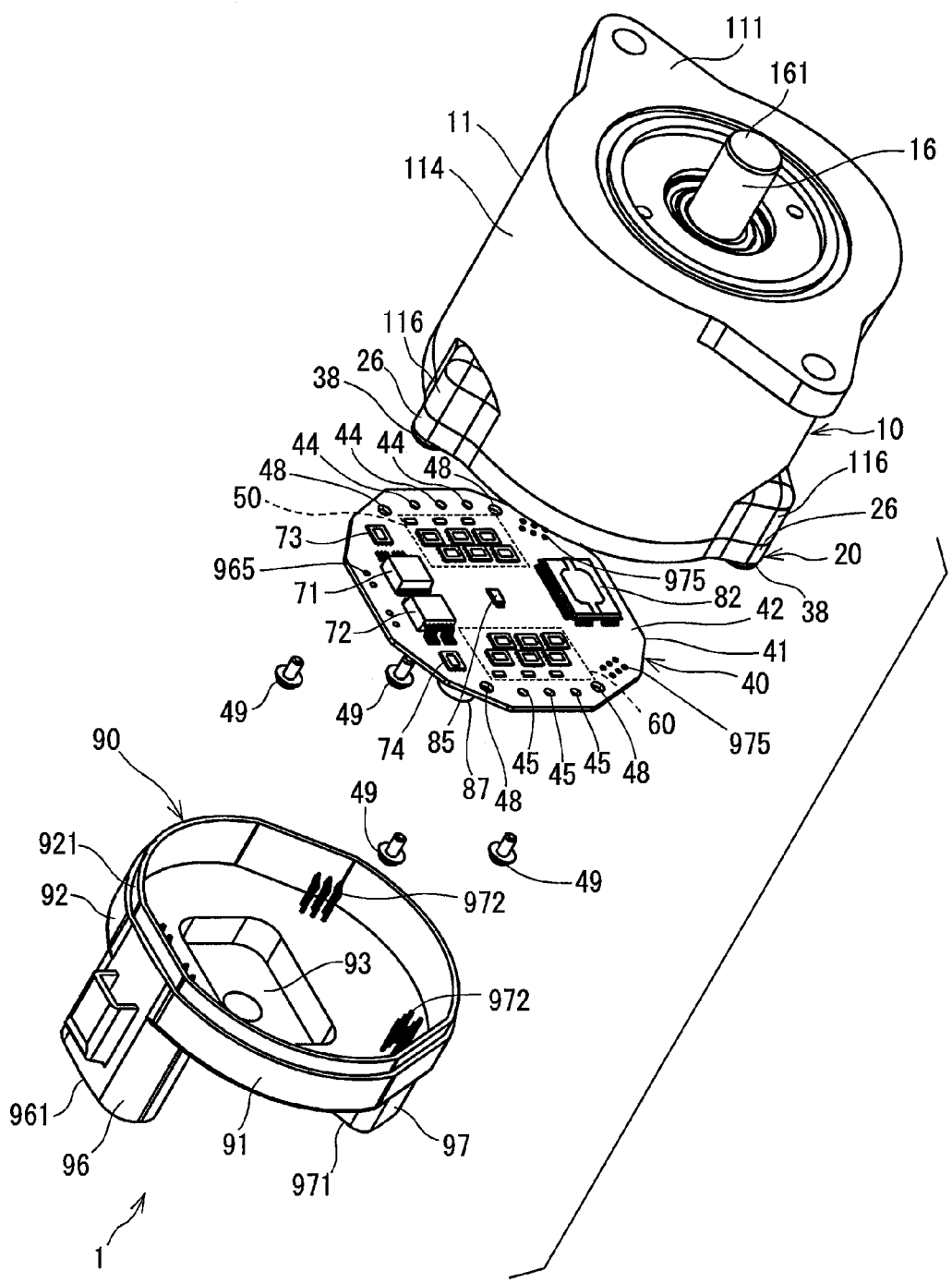
FIG. 8 is another exploded perspective view of the drive unit in the first embodiment of the present disclosure.
Figure 9:
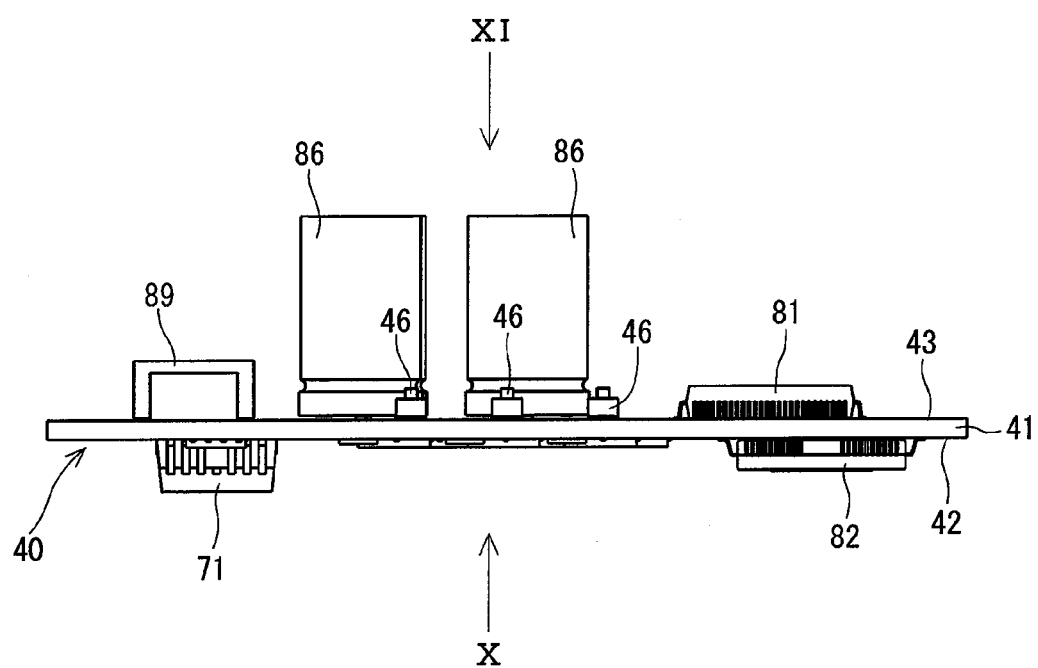
FIG. 9 is a side view of an Engine Control Unit (ECU) in the first embodiment of the present disclosure.
Figure 10:
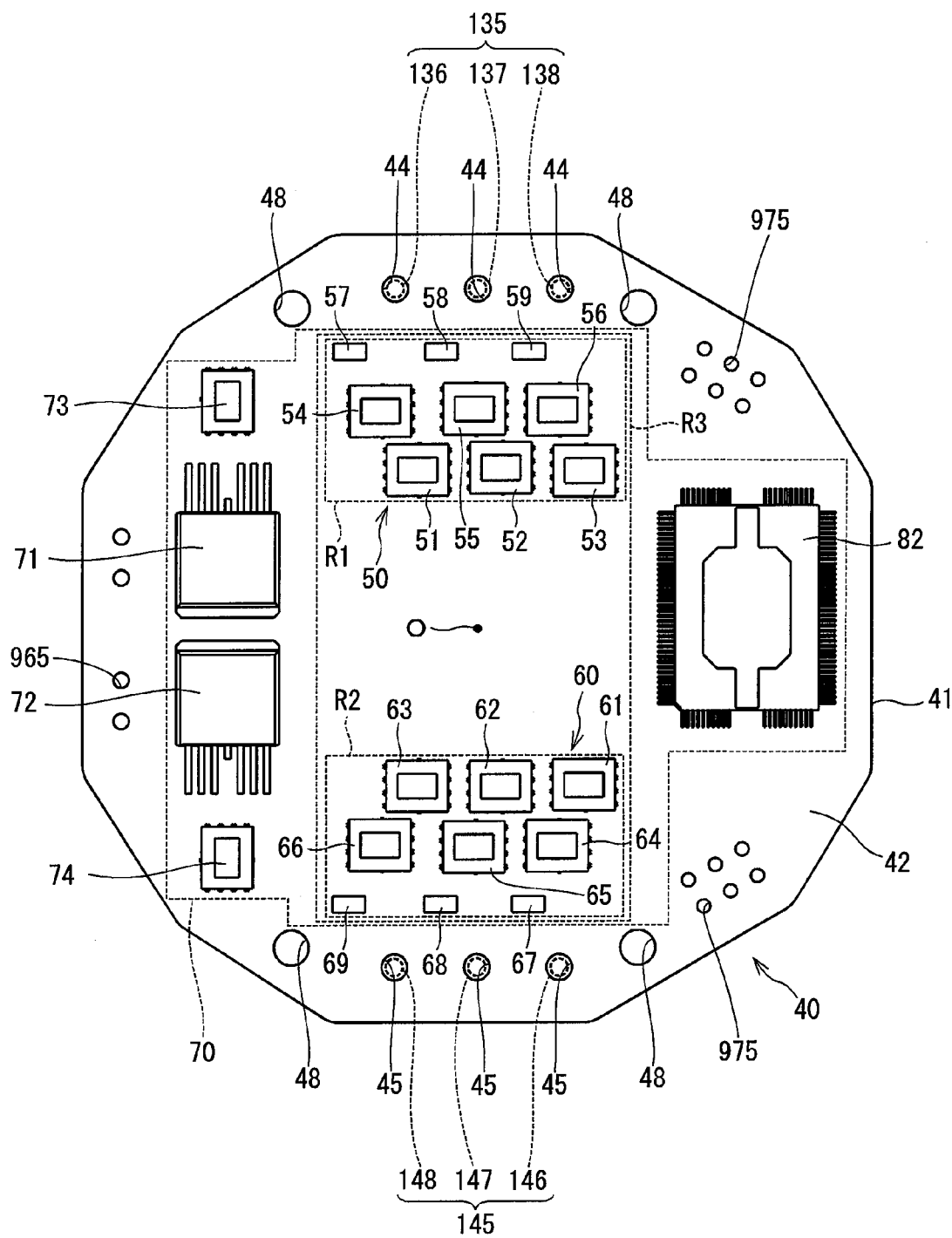
FIG. 10 is a bottom view of the ECU along an arrow X in FIG. 9.
Figure 11:
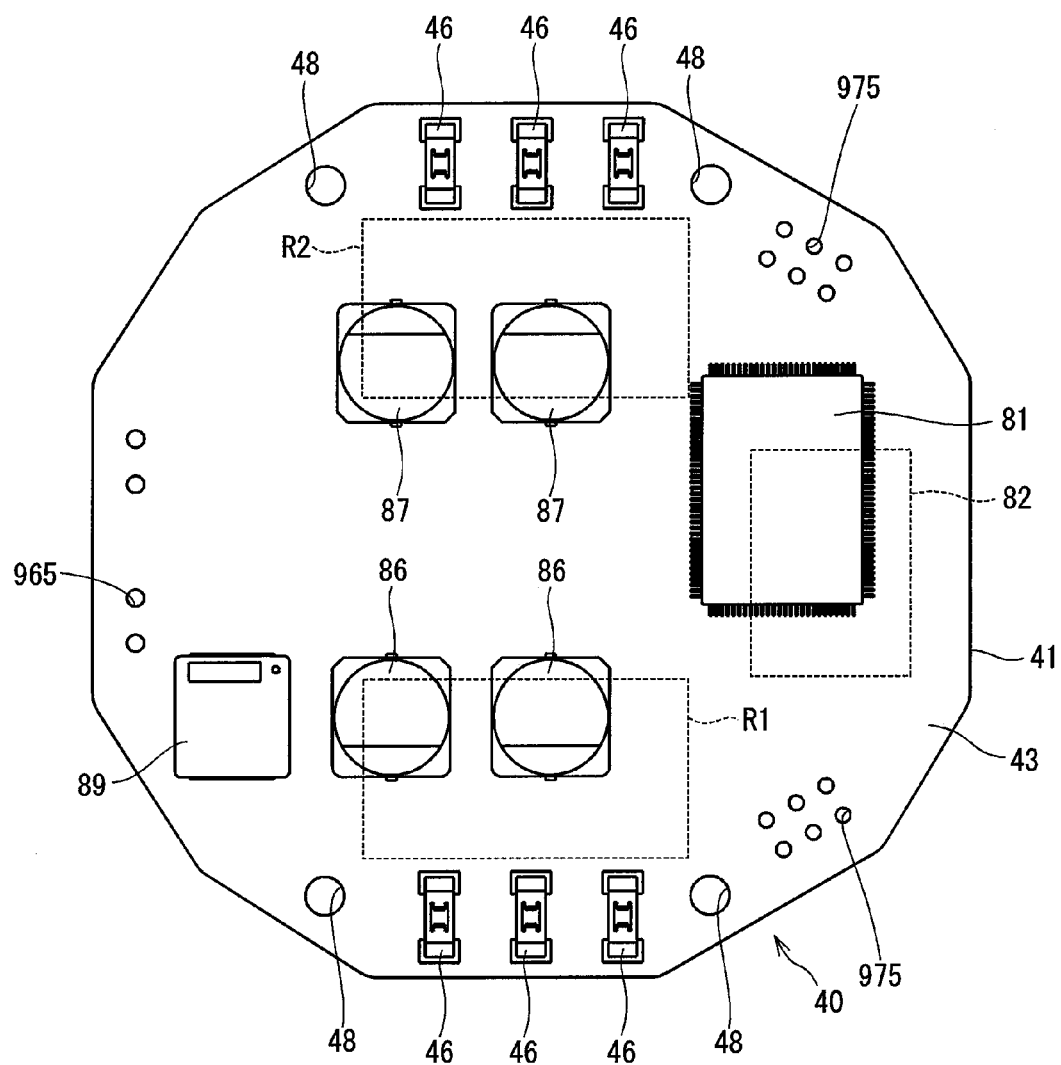
FIG. 11 is a top view of the ECU along an arrow XI in FIG. 9.

As shown in FIG. 8 and FIG. 10, for example, the SW elements 51-56, 61-66 as well as the current detection elements 57-59, 67-69, the power relays 71, 72, the reverse connection protection relays 73, 74, the ASIC 82, and the rotational angle sensor 85 are surface-mounted on the heat generation element mounting surface 42 together with other parts. The rotational angle sensor 85 is omitted from the illustration in FIG. 10. In FIG. 11, a dashed line shows a region where a mold case of the ASIC 82 is disposed.

The rotational angle sensor 85 is mounted substantially at a center position on the heat generation element mounting surface 42, which faces the magnet 18 which is exposed from the frame member 20. Here, when the axis line of the shaft 16 and its extension are considered as the center axis O of the motor 10, the rotational angle sensor 85 is mounted on the center axis O of the heat generation element mounting surface 42 (see FIG. 3).

A first region R1, where the SW elements 51-56 and the current detection elements 57-59 of the first inverter part 50 are mounted, and a second region R2, where the SW elements 61-66 and the current detection elements 67-69 of the second inverter part 60, are symmetrically arranged on the opposite sides of the center axis O of the motor 10. In the present embodiment, the SW elements 51-56 and the SW elements 61-66 are arranged as axially-symmetric on both sides of a straight line passing through the center axis O of the motor 10.

Further, when a driver element mounting region R3 is defined as an area including the first region R1 and the second region R2 and the center axis O, (i) the power supply relays 71, 72 and the reverse connection protection relays 73, 74 and (ii) the ASIC 82 are positioned outside of the driver element mounting region R3 on opposite sides relative to the region R3.

In the present embodiment, the regions R1 to R3 are rectangular areas, the regions R1 to R3 may be in any shape other than the rectangular shape, depending on the implementation positions of the SW elements 51-56, 61-66 and the current detection elements 57-59, 67-69.

The three phases of U, V, W are arranged in order from the relay 71 side in the first inverter part 50, and the three phases of W, V, U are arranged in order from the relay 72 side in the second inverter part 60, which makes a symmetric relation between the two inverters 50, 60 for the three phases. In the present embodiment, the phase sequence of the second system 202 is in a reverse order to the phase sequence of the first system 201.

Thereby, while the impedance is reduced, the length of wiring in each of the three phases on the substrate 41 is substantially equated, and the variation of the impedance in each of the three phases is reduced, or equated. The "symmetry" in the above means a substantially-symmetric arrangement of the three phases, allowing a dimension error in the actual product.

Further, the SW elements 54-56 connected to the low potential side are arranged on the outside of the SW elements 51-53 connected to the high potential side, and the current detection elements 57-59 are arranged further on the outside thereof.

Similarly, the SW elements 64-66 connected to the low potential side are arranged on the outside of the SW elements 61-63 connected to the high potential side, and the current detection elements 67-69 are arranged further on the outside thereof.

On one side of each of the SW elements 51-56, 61-66, the current detection elements 57-59, 67-69, the power relays 71, 72, the reverse connection protection relays 73, 74, and the ASIC 82 which are mounted on the heat generation element mounting surface 42, i.e., a side facing the frame member 20, a heat dissipation slug made of heat conductive metal, e.g., cupper, is disposed which is exposed from the resin mold.

Further, the SW elements 51-56, 61-66, the current detection elements 57-59, 67-69, the power relays 71, 72, the reverse connection protection relays 73, 74, and the ASIC 82 respectively contact the ECU side face 31 of the frame member 20 in a heat transferable manner via a heat dissipation gel which is not illustrated. Thereby, heat generated by the SW elements 51-56, 61-66, the current detection elements 57-59, 67-69, the power relays 71, 72, the reverse connection protection relays 73, 74, and the ASIC 82 is dissipated via the heat dissipation gel to the frame member 20. In FIG. 3 or other drawings, the ASIC 82 and the frame member 20 may look like disposed in a non-contacting state, as a result of the omission of the heat dissipation gel.

That is, the SW element 51-56, 61-66, current detection elements 57-59, 67-69, the power relays 71, 72, the reverse connection protection relays 73, 74, and the ASIC 82 are respectively a heat generation element 70 in the present embodiment.

The power relays 71, 72, which are a large size element in comparison to the SW elements 51-56, 61-66 and the reverse connection protection relays 73, 74, are accommodated in the relay rooms 33, 34 provided on the ECU side face 31 of the frame member 20.

The ASIC 82, which is a large size element in comparison to the SW elements 51-56, 61-66 and the reverse connection protection relays 73, 74, is accommodated in the ASIC room 35 provided on the ECU side face 31 of the frame member 20.

In the present embodiment, the frame member 20 defines an outline of the motor 10, provides a support for the ECU 40, and provides a heat dissipation path for dissipating heat from the heat generation element 70. Thereby, as compared with a case in which a heat sink is provided separately, the number of components is reduced, and the volume of the drive unit is reduced.

As shown in FIG. 7 and FIG. 11, for example, the microcomputer 81, the capacitors 86, 87, and the choke coil 89 are mounted on the electronic component mounting surface 43, together with other parts. The microcomputer 81 is mounted at a position on a reverse side of the substrate 41, i.e., partially overlapping with the ASIC 82 as seen in FIG. 11.

The capacitor 86 is mounted on a reverse side of the substrate 41, i.e., partially overlapping with the first region R1 in which the SW elements 51-56 of the first inverter part 50 are mounted. The capacitor 87 is mounted on a reverse side of the substrate 41, i.e., partially overlapping with the second region R2 in which the SW elements 61-66 of the second inverter part 60 are mounted. The noise reduction effect increases by arranging the capacitors 86, 87 on the reverse side of the inverter parts 50, 60. The capacitors 86, 87 and the choke coil 89 are taller than the heat generation element 70 in terms of height on the substrate 41. That is, in the present embodiment, the capacitors 86, 87 and the choke coil 89 are the "electronic components."

In the present embodiment, by mounting relatively large-size electronic components, e.g., the capacitors 86, 87 and the choke coil 89, on the electronic component mounting surface 43, the substrate 41 is positioned at a proximity of the frame member 20. Thereby, heat generated by the heat generation element 70 on the heat generation element mounting surface 42 is dissipated to the frame member 20 from the "back" of those components.

A radius outside position of the first region R1 has a motor line insertion hole 44 bored therethrough. The motor line 135 is inserted into the motor line insertion hole 44. A radius outside position of the second region R2 has a motor line insertion hole 45 bored therethrough. The motor line 145 is inserted into the motor line insertion hole 45.

On the electronic component mounting surface 43, a motor line connector 46 made from a conductive metal or the like is provided at a position where the motor line insertion holes 44 and 45 are bored. The motor line connector 46 has a press-fit part, and the press-fit part receiving the motor lines 135 and 145 establishes an electrical connection between the substrate 41 and the motor lines 135, 145.

A hole 48 is bored at a position corresponding to the substrate fixing tab 32 of the substrate 41. A substrate lockscrew 49 (see FIGS. 7 and 8) is inserted into the hole 48, and is tightly screwed onto the substrate fixing tab 32 of the frame member 20. The substrate 41 is fixed onto the frame member 20 by the axial force of the substrate lockscrew 49.

As shown in FIGS. 3-8, a cover member 90 has a cover body 91, the power supply connector 96, and a signal connector 97, and covers the electronic component mounting surface 43 side of the substrate 41.

An insert portion 921 is disposed in the end of a peripheral wall 92 of the cover body 91. The insert portion 921 is inserted into the adhesion groove 37 of the frame member 20, and is fixed by the adhesive. Thereby, water or the like is prevented from intruding into the motor 10 from a connection portion between the frame member 20 and the cover member 90.

A capacitor room 93 is formed substantially at the center of the cover body 91. The capacitor room 93 protrudes from the cover body 91, i.e., away from the motor 10, for accommodating the capacitors 86, 87. A breathing hole 94 is bored on the capacitor room 93. The breathing hole 94 has a filter member 95 attached thereon. The filter member 95 is made from a material that passes air but does not pass the water. By having the filter member 95 in the breathing hole 94, the inner pressure of the drive unit 1 stays constant at a certain value even when the temperature changes.

The power supply connector 96 and the signal connector 97 (i.e., "connectors 96 and 97" hereinafter) respectively protrudes away from the cover body 91, i.e., away from the motor 10. In the present embodiment, the connectors 96 and 97 are integrally formed with the cover body 91 in one body.

The power supply connector 96 has an opening 961 disposed on one end which extends away from the motor 10, for a connection to a harness (not illustrated) that extends from the battery 109. Further, the power supply connector 96 has a power supply connector terminal 962 connected to the substrate 41. The power supply connector terminal 962 is inserted into a terminal insertion hole 965 bored on the substrate 41, and is connected to the substrate 41 by solder or the like. Thereby, the ECU 40 is connected to the battery 109.

The signal connector 97 has an opening 971 disposed on one end which extends away from the motor 10, for a connection to a harness (not illustrated). In the present embodiment, two signal connectors 97 are provided, among which one is connected to a harness extending from the torque sensor 103 and the other is connected to a harness extending from CAN. Further, the signal connector 97 has a signal connector terminal 972 connected to the substrate 41. The signal connector terminal 972 is inserted into a terminal insertion hole 975 disposed on the substrate 41, and is connected to the substrate 41 by solder or the like. Thereby, information from the torque sensor 103 and information from CAN are input into the ECU 40. In the present embodiment, the battery 109, the torque sensor 103, and the CAN serve as "outside" in the claims.

The tip of each of the power supply connector terminal 962 and the signal connector terminal 972 (i.e., "terminals 962 and 972" hereinafter) is inserted into the terminal receptacle groove 36 that is formed on the ECU side surface 31 of the frame member 20, so that the terminals 962, 972 and the frame member 20 are not short-circuited with each other.

In the present embodiment, the connectors 96, 97 are formed in one body with the cover body 91, a body part of each of the connectors 96, 97 is positioned away from the substrate 41, i.e., has some gap interposed between the connectors 96, 97 and the substrate 41, except for the terminals 962, 972.

Figure 12:
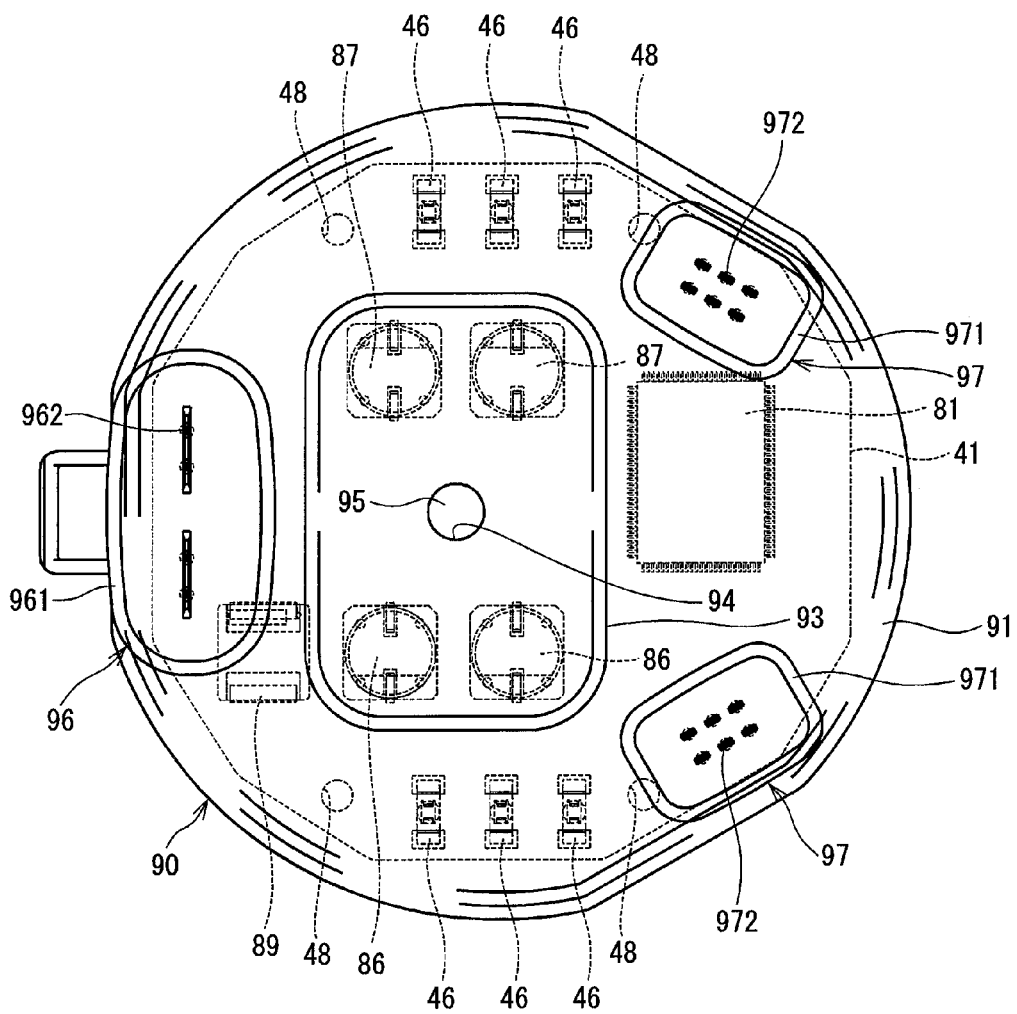
FIG. 12 is a plan view of component arrangement between components and a connector on a electronic component mounting surface in the first embodiment of the present disclosure.

The connectors 96 and 97 extend away from the motor 10 relative to the substrate 41, i.e., an one axial end of the motor 10. Further, in the axial view of the motor 10, as shown in FIG. 12, the connectors 96 and 97 are positioned within the projection area of the motor case 11, at radius outside positions, i.e., farther away from the center axis O of the motor 10 than the capacitors 86, 87. In other words, a connector disposition region and a capacitor disposition region are not overlapping with each other in the axial view of the motor 10.

Therefore, in comparison to a conventional configuration in which the connector disposition region and the capacitor disposition region are overlapping with each other, the size along the axis (i.e., the height) of the drive unit 1 in the present disclosure is minimized, while preventing the increase of the diameter/radius of the drive unit 1.

Figure 13:
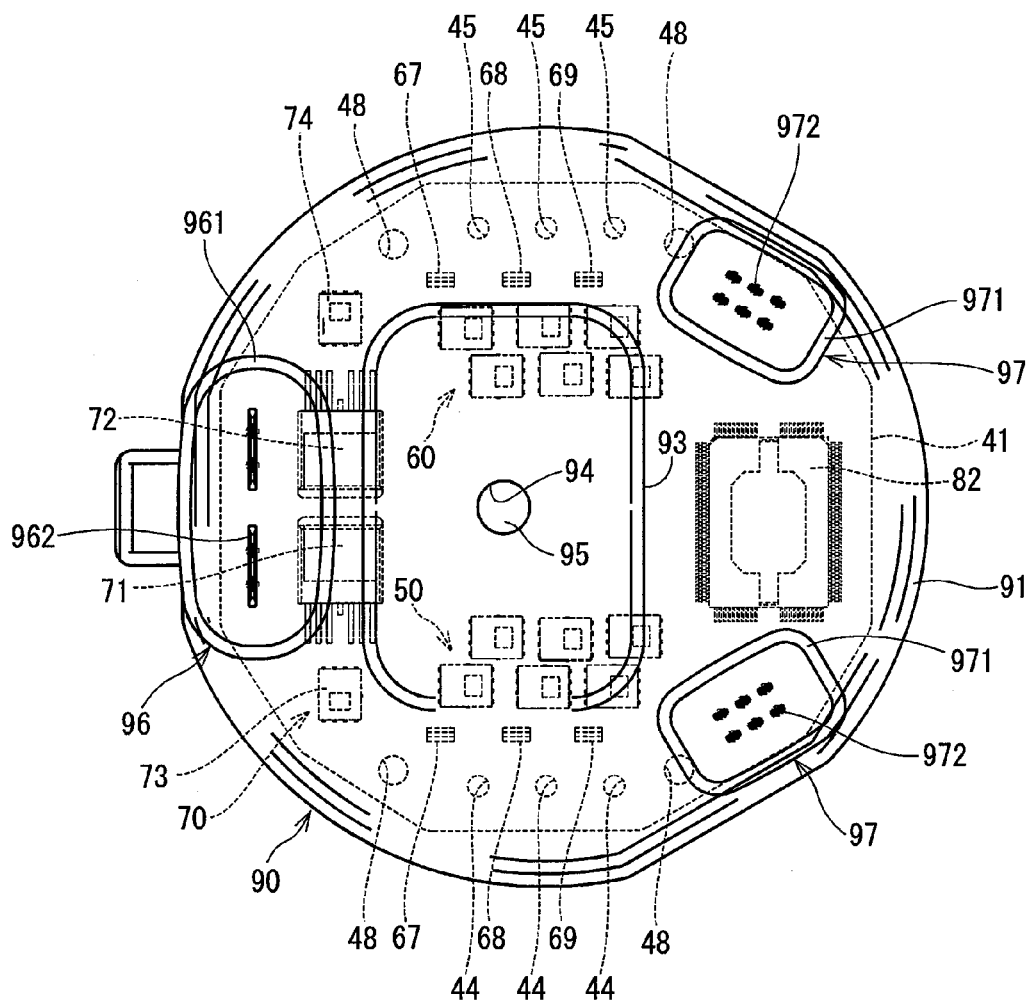
FIG. 13 is another plan view of component arrangement between components and a connector on a heat generation element mounting surface in the first embodiment of the present disclosure.

Further, as shown in FIGS. 12 and 13, the connection part of the substrate 41 and terminals 962 and 972 is provided at a radial outside than the region where the heat generation element 70 and capacitors 86 and 87 are mounted. Thereby, the mounting region of the substrate 41 can be used effectively. Further, the connectors 96 and 97 positioned radius outside of the capacitors 86 and 87, the size/length of each of the terminals 962 and 972 is reduced.

In FIGS. 12 and 13, electronic components of various types mounted on the substrate 41 are drawn in dashed line, together with the substrate 41 itself.

As described in full details above, the drive unit 1 is provided with the motor 10, the frame member 20, and the ECU 40.

The motor 10 has the stator 12, the rotor 15, and the shaft 16. The stator 12 has the first winding group 13 and the second winding group 14 wound thereon. The rotor 15 is rotatably disposed in an inside of the stator 12. The shaft 16 rotates together with the rotor 15.

The frame member 20 is disposed on one axial end of the motor 10.

The ECU 40 has the substrate 41, the heat generation element 70, as well as the capacitors 86, 87 and the choke coil 89. The substrate 41 is fixed onto the frame member 20 on one side, i.e., an opposite side relative to the motor 10. The heat generation element 70 is mounted on the heat generation element mounting surface 42, which is one side of the substrate 41 close to the frame member 20, and dissipates heat to the frame member 20. The capacitors 86, 87 and the choke coil 89 that is taller than the heat generation element 70 in terms of height on the substrate 41 is mounted on the electronic component mounting surface 43, which faces away from the frame member 20. The heat generation element 70 and the capacitors 86 and 87 are mounted on the electronic component mounting surface 43 which is an opposite side of the substrate 41 relative to the frame member 20. Further, the heat generation element 70 and the capacitors 86, 87 are arranged in the motor region which is a projection area, i.e., a projection of the cylinder part 114, which is the outline of the motor 10 along the axis of the motor 10. In the present embodiment, the "cylinder part serving as the outline of the rotating electric machine" is the cylinder part 114 of the motor case 11.

According to the present embodiment, the heat generation element 70 is positioned to be heat-conductively to the frame member 20. That is, the frame member 20 serves as an outer shell of the motor 10 and also serves as a heat sink. Further, the heat generation element 70, the capacitors 86, 87, and the choke coil 89 are positioned within the motor region. Therefore, while the number of components is reduced from conventional configurations, which has the heat sink as a dedicated/separate component, the volume of the drive unit 1 is reduced, especially along the axial direction, without increasing the volume along the radial direction.

Further, by mounting the capacitors 86, 87 and the choke coil 89, which are taller components taller than the heat generation element 70 in terms of height on the substrate 41, on the electronic component mounting surface 43, the heat dissipation from the heat generation element 70 toward the frame member 20 is not obstructed, appropriately promoting dissipation of heat that is generated by the heat generation element 70 to the frame member 20.

The drive unit 1 is further provided with the connectors 96, 96 for electrical connection from the ECU 40 to the external device. The electronic components mounted on the electronic component mounting surface 43 include the capacitors 86, 87.

In an axial view of the drive unit 10, the connectors 96 and 97 are positioned in an area that does not overlap with the capacitors 86, 87 and that overlaps at least partially with the substrate 41.

Further, since the region of the capacitors 86 and 87, which are relatively tall in the axial direction, and the region of the connectors 96 and 97 are arranged to be non-overlapping, an along-the-axis size of the drive unit 1 is reduced, which may otherwise be increased if the above-described regions are overlapping.

The connectors 96 and 97 are positioned at radial outside positions of the capacitors 86 and 87. Thereby, while reducing the terminal length, i.e., having shorter terminals 962 and 972, the mounting area of the electronic component mounting surface 43 on the substrate 41, on which the connectors 96 and 97 are disposed, is used effectively.

Further, even when the connectors 96 and 97 are disposed at radial outside positions relative to the capacitors 86 and 87, the radial size and the volume of the drive unit 1 is minimized by the above arrangement, i.e., the heat generation element 70 and the capacitors 86, 87 arranged to be within the motor region.

The connectors 96 and 97 are arranged in the motor region which is a projection area of the cylinder part 114 of the motor case 11 in the motor 10, and the openings 961 and 971 of the connectors 96 and 97 are respectively configured to look the axial direction of the motor 10. Therefore, the radial size of the drive unit 1 is reduced. The connector 96 is considered as being positioned in the motor region, since a body of the connector 96 other than a protruding part is positioned within the motor region.

The drive unit 1 is provided with the cover member 90 that covers the ECU 40 on the opposite side of the motor 10.

The connectors 96 and 97 are disposed on the electronic component mounting surface 43 of the substrate 41, and are formed in one body with the cover member 90. Thereby, the number of components is reduced.

The heat generation element 70 includes the SW elements 51-56, 61-66 which constitute the inverter parts 50 and 60 for switching the power supply to the winding groups 13 and 14. Thereby, the heat generated by the switching of the SW elements 51-56, 61-66 is appropriately dissipated to the frame member 20.

The heat generation element 70 includes the power relays 71, 72, by which the conduction of the electric current is enabled or intercepted between the inverter parts 50 and 60 and the battery 109, and the reverse connection protection relays 73 and 74. Thereby, the heat generated by the power relays 71, 72 and the reverse connection protection relays 73 and 74 is appropriately dissipated to the frame member 20.

The electronic components mounted on the electronic component mounting surface 43 include the choke coil 89. A noise is reduced by forming a filter circuit from the capacitors 86 and 87 and the choke coil 89. Further, by mounting the choke coil 89 which is a relatively large component on the electronic component mounting surface 43, the heat dissipation from the heat generation element 70 is not obstructed, appropriately promoting dissipation of heat that is generated by the heat generation element 70 to the frame member 20.

The ECU 40 includes the rotational angle sensor 85 that is mounted on the heat generation element mounting surface 42, i.e., at a position facing the shaft 16. Thereby, rotation of the shaft 16 is appropriately detectable.

The frame member 20 has the magnet room 231 that accommodates the magnet 18, when the magnet 18 is disposed on the other end 162 of the shaft 16. Further, the frame member 20 has the bearing support part 232 that rotatably supports the bearing 167 for supporting the shaft 16. By disposing the magnet room 231 and the bearing support part 232 on the frame member 20, the volume of the drive unit 1 is reduced.

The drive unit 1 of the present embodiment is applied to the electric power steering device 8. In other words, the electric power steering device 8 is provided with the drive unit 1 and the speed reduction gear 9 which transmits the torque outputted from the motor 10 to the column shaft 102, drives the column shaft 102 by the torque of the motor 10, and assists a steering operation of the steering wheel 101 by the driver.

The drive unit 1 of the present embodiment has the motor 10 and the ECU 40 coaxially disposed for the volume/size reduction along the axis of the drive unit 1, and is configured to have a slim shape, i.e., has the entire device substantially contained in the motor region, which is a projection silhouette of the cylinder part 114 along the axial direction of the drive unit 1. Thereby, the drive unit 1 is workable, e.g., easy to install in a small space under the hood of the vehicle. Further, the drive unit 1 of the present embodiment has the O ring 39 provided at a position between the motor case 11 and the frame member 20 and also has the frame member 20 and the cover member 90 combined by using adhesive, thereby realizing a waterproof structure. Therefore, the drive unit 1 may be disposed in an engine room, for example, and is suitably used in a rack-assist type electric power steering.

Second Embodiment

Figure 14:
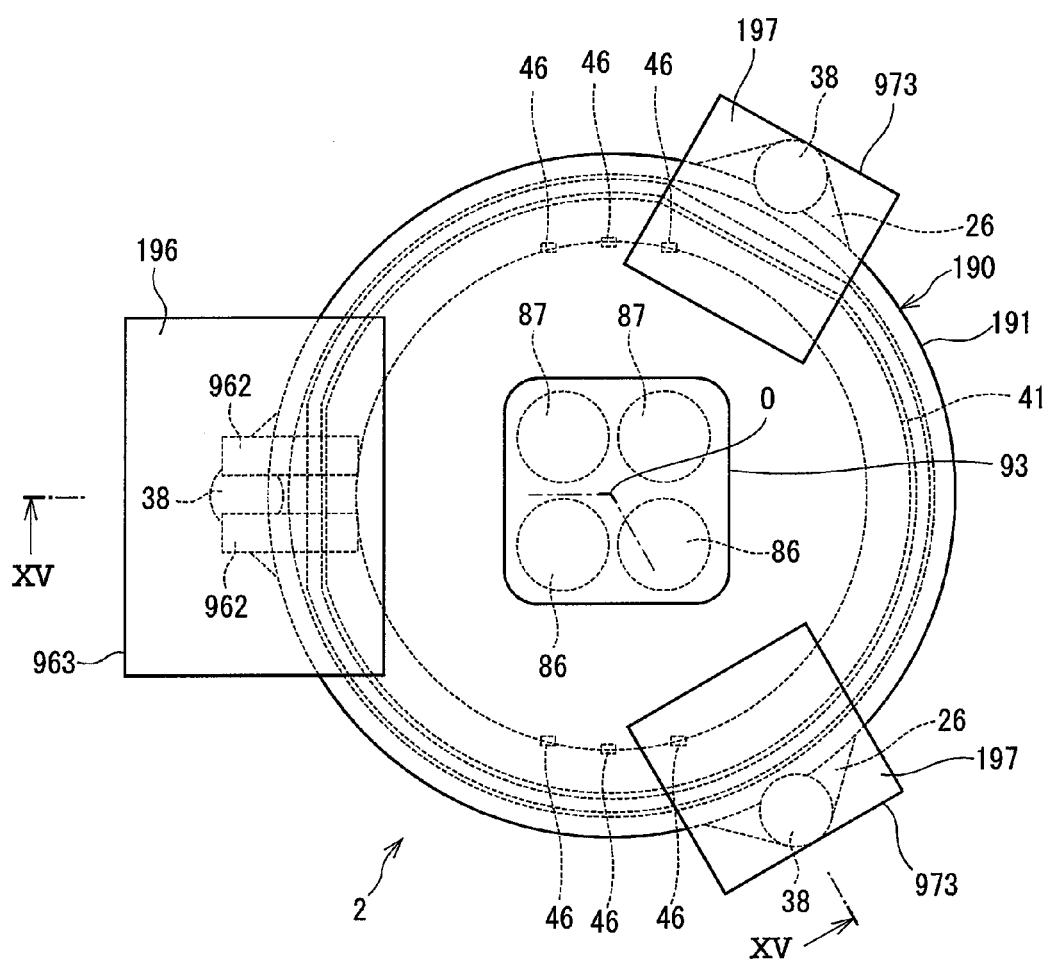
FIG. 14 is a plan view of the drive unit in a second embodiment of the present disclosure.
Figure 15:
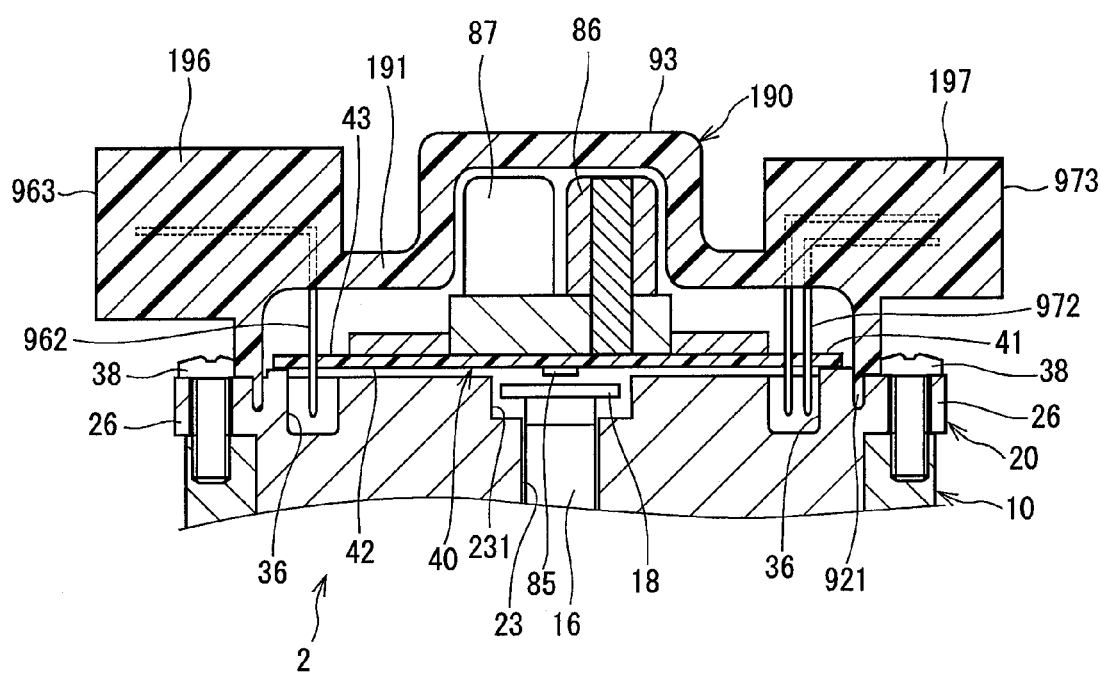
FIG. 15 is a sectional view of FIG. 14 along an XV-O-XV line.

The drive unit in the second embodiment of the present disclosure is shown in FIGS. 14 and 15. FIGS. 14 and 15 are illustration purpose only, omitting not relevant components other than the capacitors 86, 87 on the substrate 41. That is, in FIG. 14, the capacitors 86, 87 and the substrate 41 are drawn in broken lines together with other components, and, in FIG. 15, the same configuration regarding the motor 10 and the frame member 20 is partially simplified.

The cover member 190 has a cover body 191, a power supply connector 196, and a signal connector 197, and covers the electronic component mounting surface 43 of the substrate 41.

The power supply connector 196 and the signal connector 197 (i.e., "connectors 196 and 197" hereafter) protrude from the cover body 191 away from the motor 10. In the present embodiment, the connectors 196 and 197 are formed in one body with the cover body 191.

An opening 963 of the power supply connector 196 faces away from the center axis O, i.e., opens toward the radial outside of the drive unit 2, allowing a connection to a not-illustrated harness that extends from the battery 109 along the radius of the drive unit 2.

An opening 973 of the signal connector 197 faces away from the center axis O, i.e., opens toward the radial outside of the drive unit 2, allowing a connection to a not-illustrated harness that extends along the radius of the drive unit 2.

The connectors 196 and 197 are formed at positions that are radial outside of the capacitors 86 and 87. That is, in an axial view of the drive unit 2, the capacitor region, including the capacitors 86, 87 and the connector region, including the connectors 96, 97 do not overlap. Therefore, in comparison to other configurations, in which the capacitor region and the connector region overlap in the axial view, the axial size of the drive unit 2 is reduced. Further, even though the connectors 196 and 197 respectively protrude from the motor region, the volume along the axis of the drive unit 2 is minimized. In such configuration, depending on the size/volume of the capacitors 86 and 87 and the connectors 196 and 197, an axial end of the drive unit 2 may be formed as the capacitor room 93 or may be formed as the connectors 196, 197.

The connectors 196 and 197 extending in different directions from the above embodiment, i.e., having the openings 963, 973 looking in different ways from the above embodiment, have the substantially-similar configuration, e.g., the same function as the connectors in the above embodiment.

Further, by simply changing the extending direction of the terminals 962, 972 and the cover member 190, the connection structure for connecting the harness is changeable depending on the arrangement of the other devices or the like, without changing the configuration of the motor 10, the ECU 40 etc.

In the drive unit 2 of the present embodiment, the openings 963 and 973 of connectors 196 and 197 are structured to look in the radius direction. Thereby, the volume of the drive unit along the axial direction is reduced.

Further, the same effect as the above-mentioned embodiment is achieved.

Third Embodiment

Figure 16:
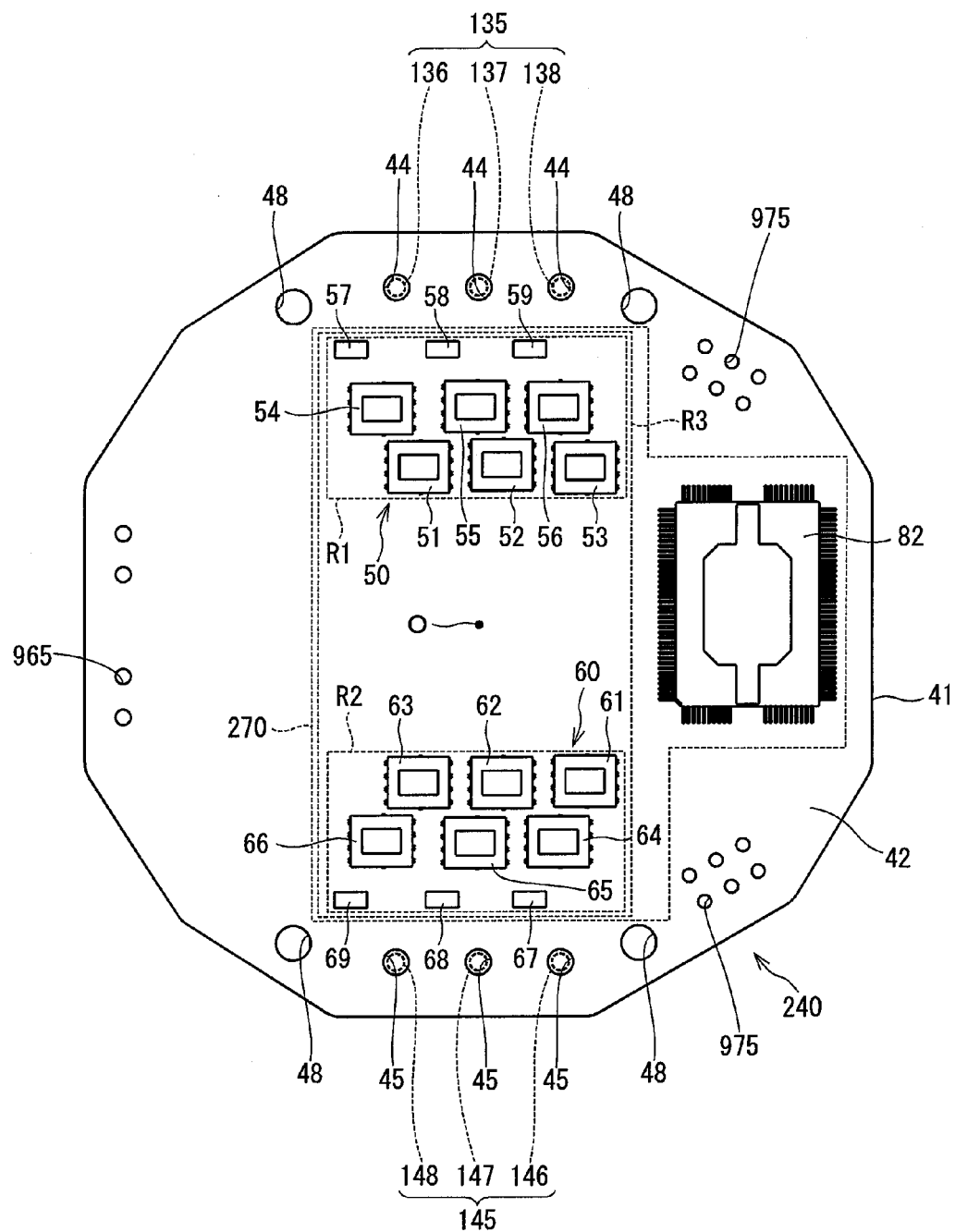
FIG. 16 is a plan view of the heat generation element mounting surface of the ECU in a third embodiment of the present disclosure.
Figure 17:
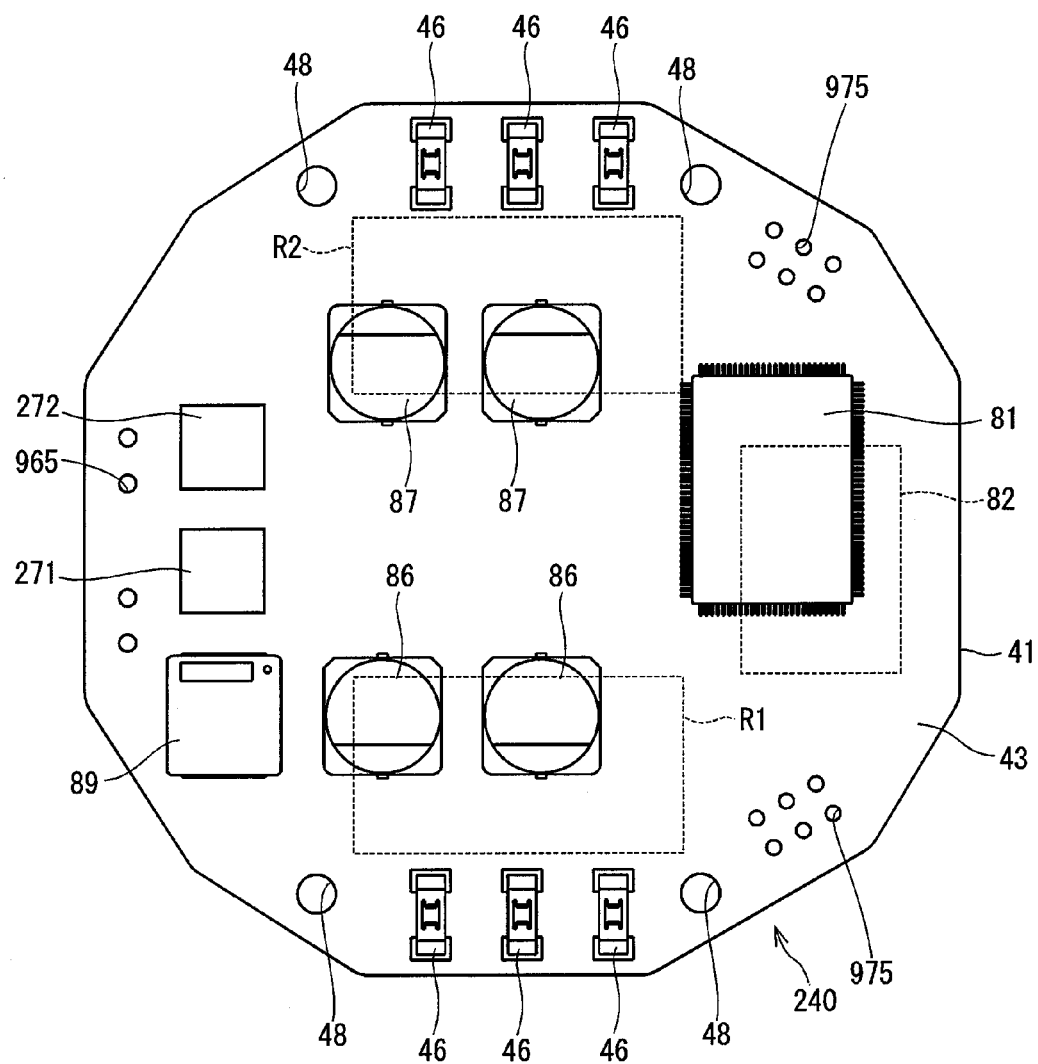
FIG. 17 is a plan view of the electronic component mounting surface of the ECU in the third embodiment of the present disclosure.

The third embodiment of the present disclosure is shown in FIGS. 16 and 17. FIGS. 16 and 17 correspond to FIGS. 10 and 11 in the first embodiment.

An ECU 240 as the controller of the drive unit in the present embodiment includes mechanical relays 271 and 272, instead of including the power relays 71, 72. The reverse connection protection relays 73 and 74 of the above-mentioned embodiment are omitted. The mechanical relays 271 and 272 do not have to dissipate heat therefrom, and are relatively large components compared with the SW elements 51-56, and 61-66, the mechanical relays 271, 272 are mounted on the electronic component mounting surface 43 of the substrate 41. That is, the SW elements 51-56, 61-66, the current detection elements 57-59, 67-69, and the ASIC 82 constitute a heat generation element 270 in the present embodiment.

In the present embodiment, the electronic components mounted on the heat generation element mounting surface 43 include the mechanical relays 271 and 272. That is, in the present embodiment, in addition to the capacitors 86, 87 and the choke coil 89, the mechanical relays 271, 272 correspond to the "electronic component." The mechanical relays 271 and 272 are capable of switching the conduction and the interception of the electric current between the inverter parts 50 and 60 and the battery 109, and are mounted on the electronic component mounting surface 43. By mounting the mechanical relays 271 and 272, which are taller components taller than the heat generation element 270 in terms of height on the substrate 41, on the electronic component mounting surface 43, the heat dissipation from the heat generation element 270 to the frame member 20 is not obstructed, thereby appropriately promoting dissipation of heat generated by the heat generation element 270 to the frame member 20. Further, the same effect as the above-mentioned embodiment is achieved.

Further, the ECU 240 of the present embodiment may be applied to any one of the drive unit 1 to drive unit 3 in the first, second and fourth embodiment.

Fourth Embodiment

Figure 18:
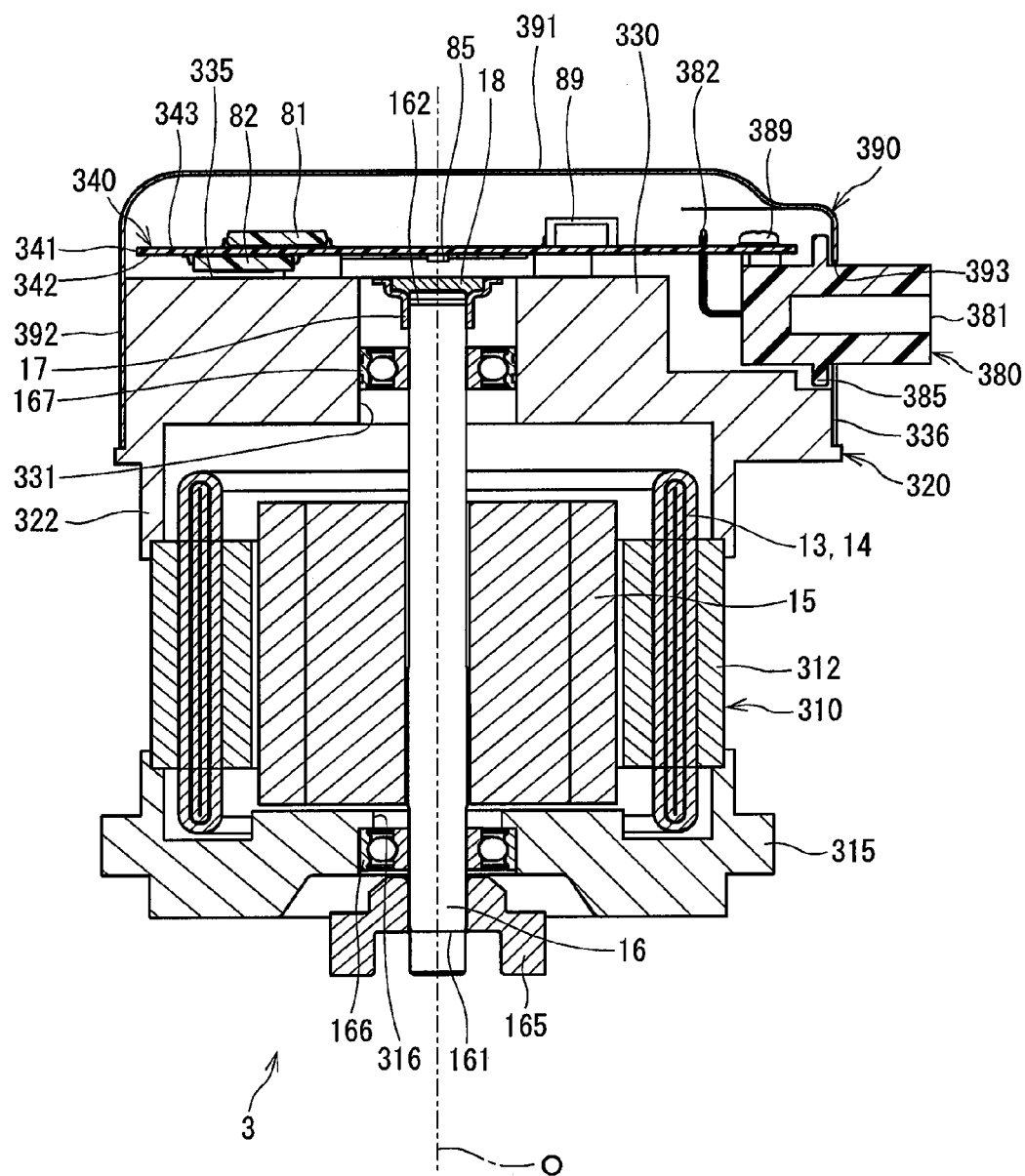
FIG. 18 is a sectional view of the drive unit in a fourth embodiment of the present disclosure.
Figure 19:
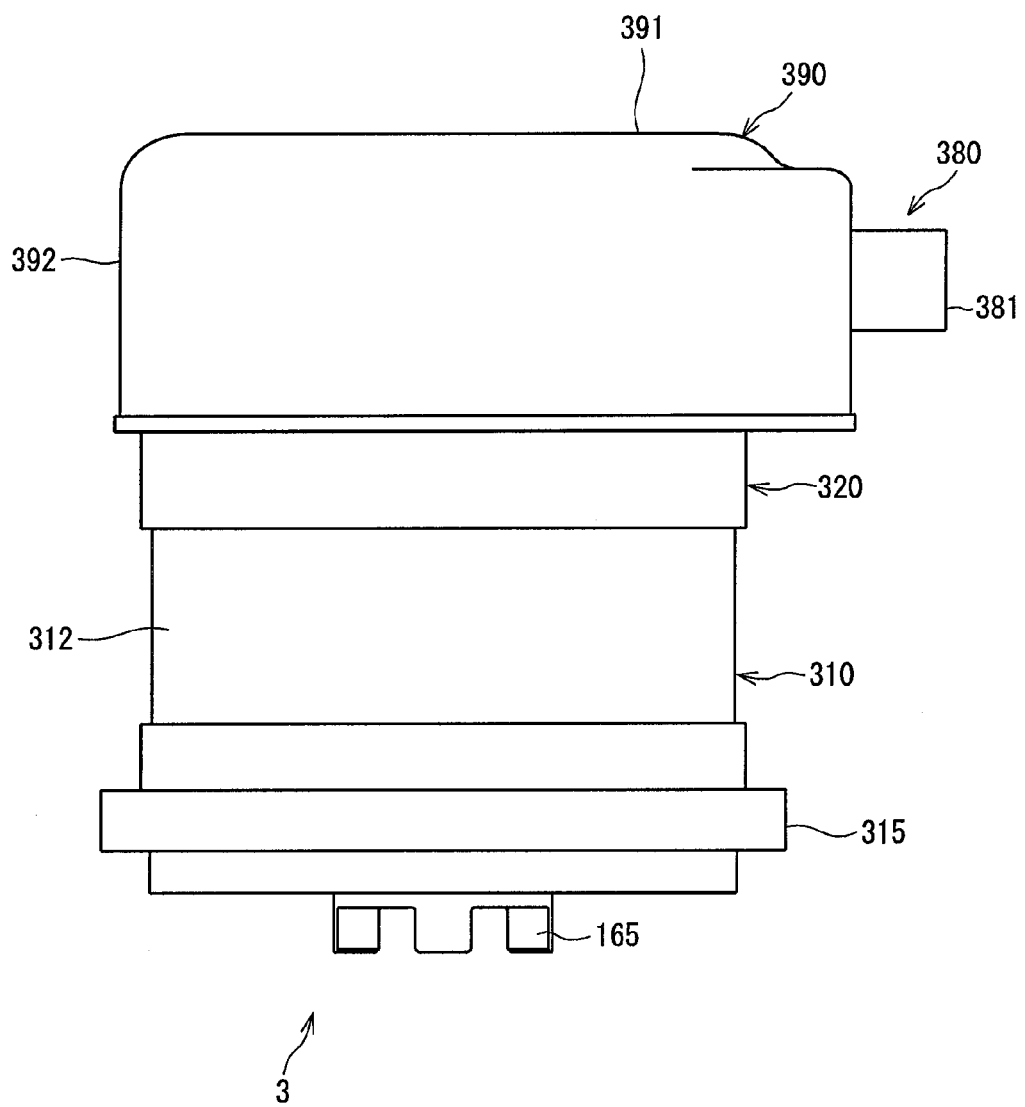
FIG. 19 is a side view of the drive unit in the fourth embodiment of the present disclosure.
Figure 20:
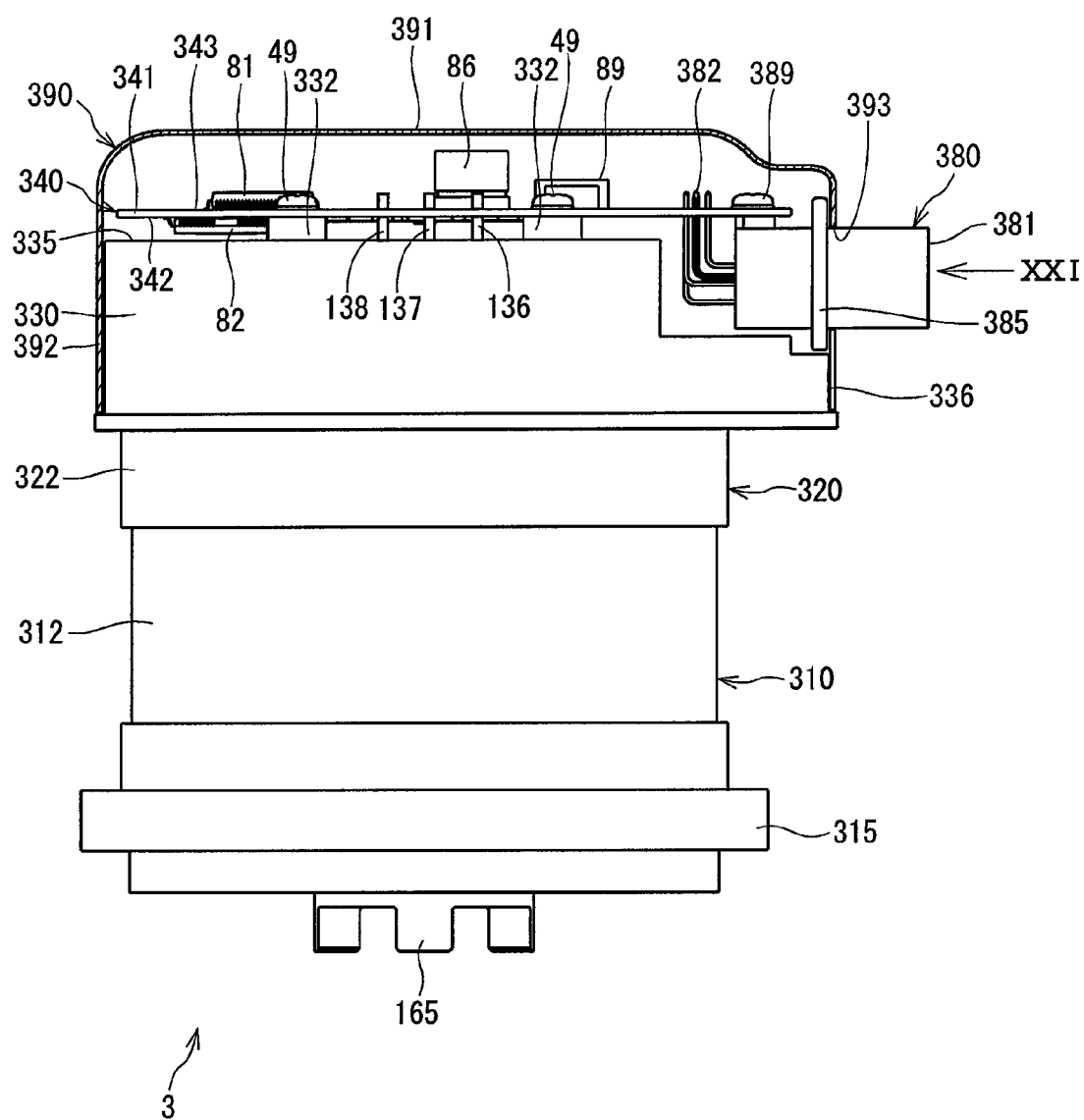
FIG. 20 is a side view FIG. 19 with a part of a cover removed therefrom.
Figure 21:
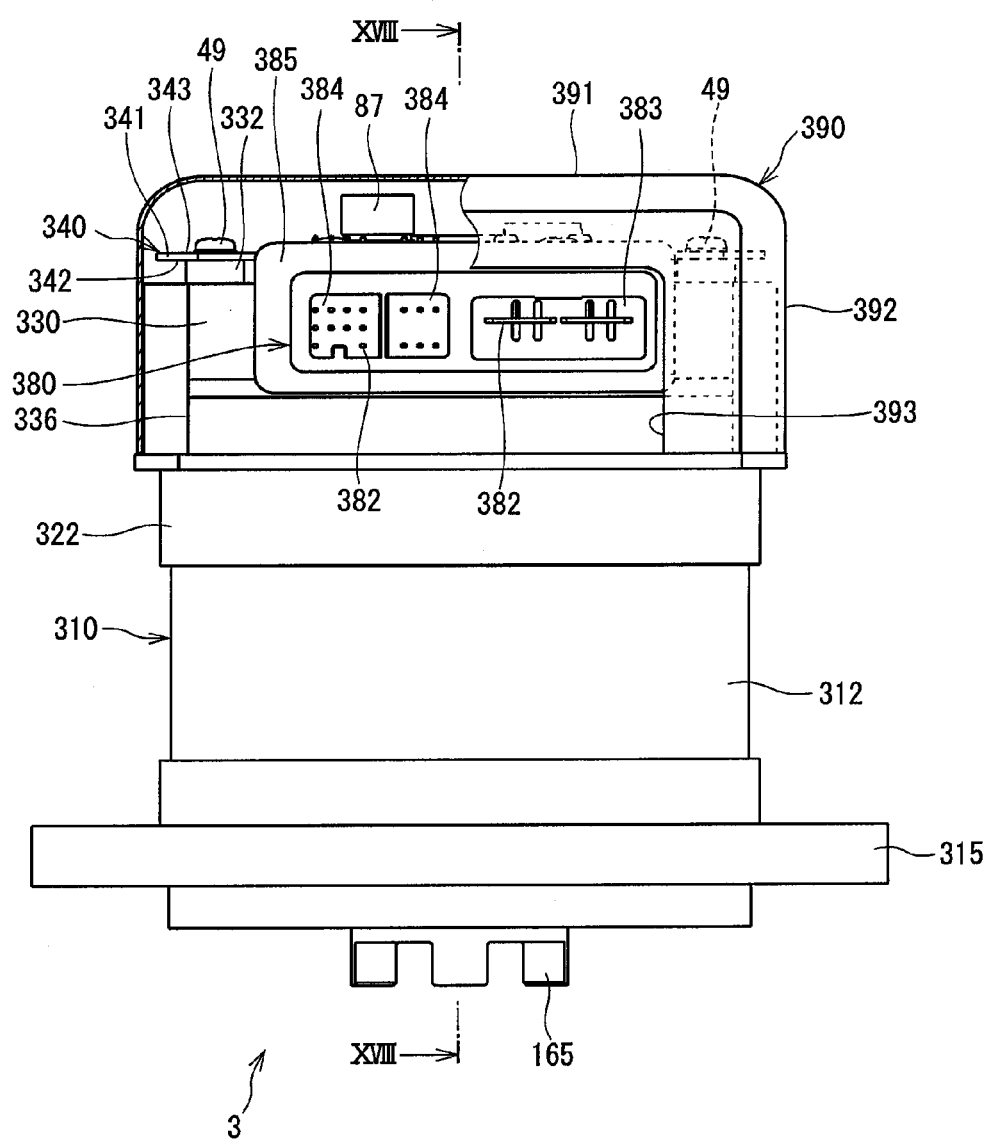
FIG. 21 is another side view of FIG. 19 along an arrow XXI in FIG. 20.

The drive unit in the fourth embodiment of the present disclosure is shown in FIGS. 18-23. FIG. 18 is a sectional view along a XVIII-XVIII line of FIG. 21. In each of the drawing in the present embodiment, the capacitors 86 and 87 are omitted in some case. A drive unit 3 is provided with a motor 310 as a rotating electric machine, a front frame end 315, a rear frame end 320, an ECU 340 as a controller, a connector 380, a cover member 390 and the like. In the present embodiment, the rear frame end 320 corresponds to a "frame member" in the claims. The electric configuration of the drive unit 3 is the same as that of the above-mentioned embodiment, which is not repeated in the following.

The motor 310 is provided with a stator 312, the rotor 15, and the shaft 16 etc., as shown in FIG. 18.

The stator 312 has the front frame end 315 and the rear frame end 320 fixed thereon. In the present embodiment, the motor case is omitted, and the stator 312 is exposed, i.e., positioned on the outer periphery along a radius of the motor 10. Other points other than the above are same as the stator 12 in the above-mentioned embodiment. That is, in the drive unit 3 of the present embodiment, the stator 312 does not have a water-proof structure. Therefore, as for the drive unit 3 of the present embodiment, it is preferably disposed inside a vehicle compartment, and is suitably applied to a column-assist type electric power steering device.

In the present embodiment, since the motor case is omitted, the stator 312 serves as the outline along a radius of the motor 10, and the "motor region" may be defined as a projection area of the stator 312.

The front frame end 315 is made from metal, e.g., aluminum, and is provided on one end opposite to the ECU 340 of the motor 310. At a substantial center of the front frame end 315, a shaft hole 316 is bored. The bearing 166 is disposed on the front frame end 315, and the one end 161 of the shaft 16 is inserted therein. In such manner, the one end 161 of the shaft 16 is exposed from the front frame end 315. An output end 165 is disposed on the one end 161 of the shaft 16. The output end 165 is connected to the speed reduction gear 9. Thereby, the torque generated by the rotation of the rotor 15 and the shaft 16 is outputted to the column shaft 102 via the speed reduction gear 9.

As shown in FIGS. 18-21, the rear frame end 320 have a frame part 322, a radiator 330, and a connector receiving part 336, and is made from a highly heat conductive material, i.e., metal such as aluminum, and is provided on the ECU 340 side of the motor 310. The front frame end 315 and the rear frame end 320 bind the motor 310 from both sides, with a not-illustrated through bold fixing the two ends together. Further, a motor line insertion hole which is not illustrated is bored on the rear frame end 320. The motor lines 135 and 145 are inserted into the motor line insertion hole, and are taken out toward the ECU 340.

The frame part 322 is disposed in the motor 310 side in a ring shape, and is fixed onto the stator 312 of the motor 310.

The radiator 330 is set up to stand on the ECU 340 side of the frame part 322.

A shaft hole 331 is bored at the axial center O of the radiator 330. The bearing 167 is disposed in the shaft hole 331 and an other end 162 of the shaft 16 is inserted thereinto. Further, the shaft hole 331 accommodates the magnet 18. Thereby, the magnet 18 disposed on the other end 162 of the shaft 16 is exposed toward the ECU 340. In the present embodiment, the shaft hole 331 corresponds to the "magnet room" and the "bearing support part."

A substrate base 332 is disposed on the radiator 330. On one side of the radiator 330 close to the ECU 340, a heat dissipation surface 335 is provided.

The connector receiving part 336 protrudes outward in the radius direction from the radiator 330. A connector 380 is disposed on the ECU 340 side of the connector receiving part 336. The connector receiving part 336 and the connector 380 are interposed with a gap.

The ECU 340 is disposed on one side of the rear frame end 320, which is opposite to the motor 310, and the ECU 340 and the motor 310 are substantially co-axially arranged.

The ECU 340 has a substrate 341 on which various electronic components forming the ECU are mounted.

The substrate 341 is formed in a shape that is contained within a projection region of the rear frame end 320. Further, the SW elements 51-56, 61-66, the current detection elements 57-59, 67-69, the capacitors 86 and 87, and the choke coil 89 disposed on the substrate 341 to be serving as the ECU 340 are contained within the motor region.

Here, one side of the substrate 341 close to the motor 310 is defined as a heat generation element mounting surface 342, and the opposite side away from the motor 310 is defined as an electronic component mounting surface 343.

Figure 22:
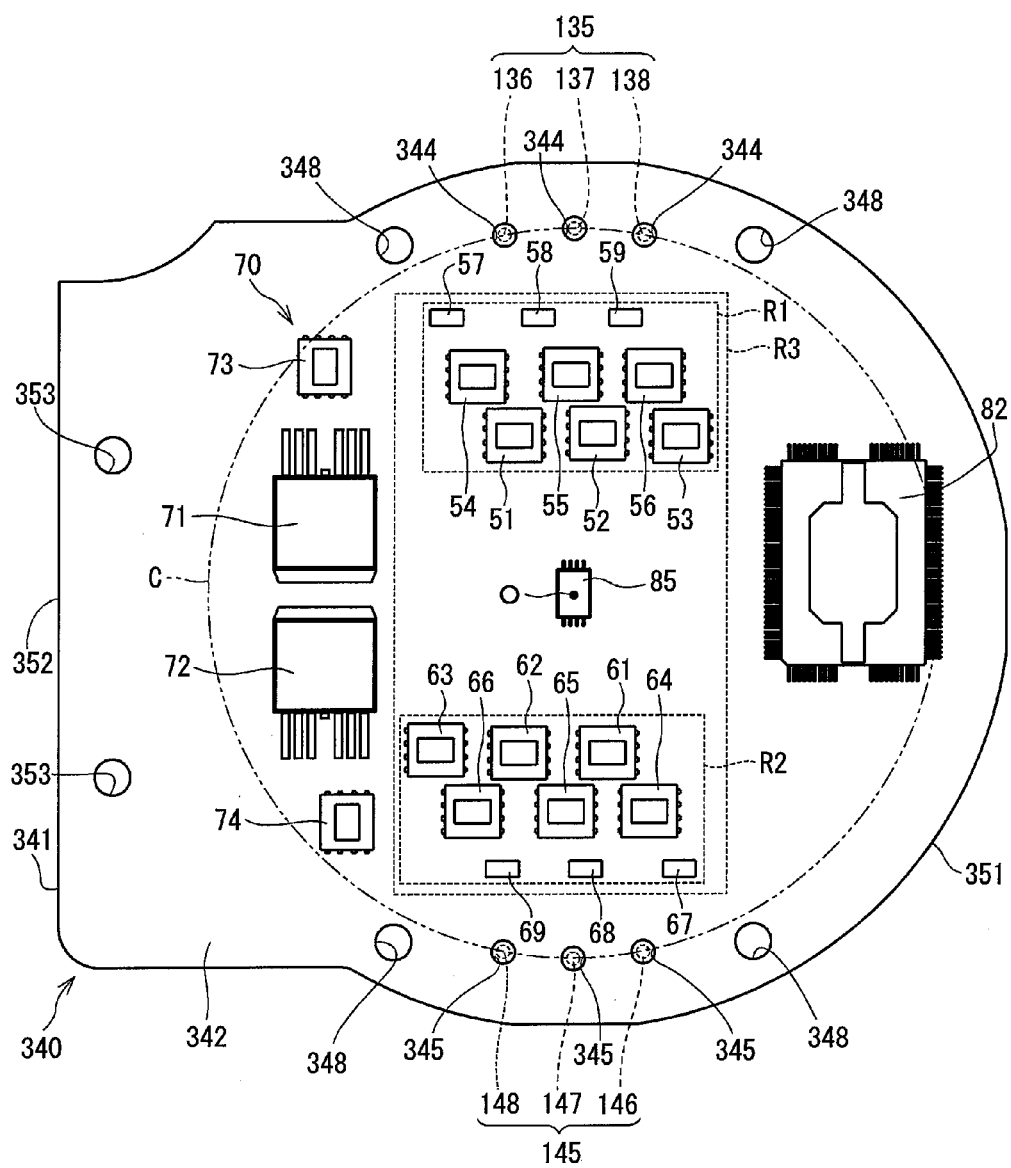
FIG. 22 is a plan view of the heat generation element mounting surface of the ECU in the fourth embodiment of the present disclosure.
Figure 23:
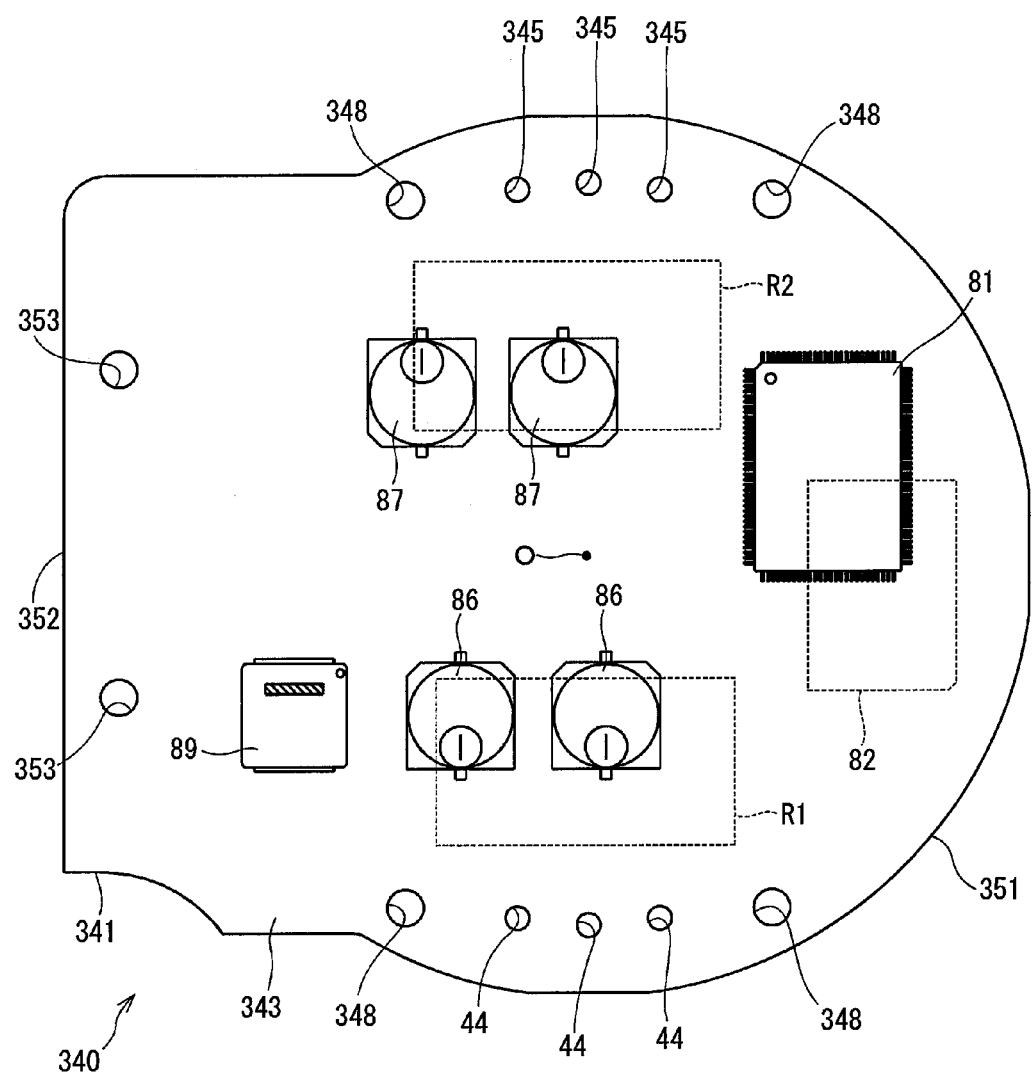
FIG. 23 is a plan view of the electronic component mounting surface of the ECU in the fourth embodiment of the present disclosure.

As shown in FIG. 22, the SW elements 51-56, 61-66, the current detection elements 57-59, the power relays 71, 72, the reverse connection protection relays 73 and 74, the ASIC 82, and the rotational angle sensor 85 are mounted on the heat generation element mounting surface 342, together with other components.

In the present embodiment, the SW elements 51-56, 61-66, the current detection elements 57-59, 67-69, the power relay 71 and 72, the reverse connection protection relays 73 and 74, and the ASIC 82 respectively contact the heat dissipation surface 335 of the radiator 330 of the rear frame end 320 via the heat dissipation gel. Thereby, the SW elements 51-56, 61-66, the power relays 71, 72, the reverse connection protection relays 73 and 74, and the ASIC 82 respectively radiate heat generated therein to the rear frame end 320 via the heat dissipation gel. Further, in an area of the electronic component mounting surface 343 which partially overlaps with the ASIC 82, the microcomputer 81 is mounted (i.e., refer to FIG. 18 and FIG. 23).

According to the present embodiment, the SW elements 51-56 which constitute the first inverter part 50 and the SW elements 61-66 which constitute the second inverter part 60 are symmetrically arranged on the axial center O of the motor 310 (i.e., around a position where the rotational angle sensor 85 is disposed in the present embodiment). In the present embodiment, the SW elements 51-56 and the SW elements 61-66 are arranged to the axial center O of the motor 310 in a point symmetric manner. Further, a phase sequence is similar to the above embodiment, i.e., in the first inverter part 50, the U, V, W phases are arranged in order from the relay 71 side, and in the second inverter part 60, the W, V, U phases are arranged in order from the relay 72 side.

Arrangement of various ECU-forming components mounted on the substrate 341 is the same as that of the above-mentioned embodiment except for the above-mentioned points.

A motor line insertion hole 344 is bored in an area that is radial outside of the first region R1 where elements constituting the first inverter part 50 of the substrate 341 are mounted. The motor line 135 is inserted into the motor line insertion hole 344, and is connected to the substrate 344 by solder etc.

A motor line insertion hole 345 is bored in an area that is radial outside of the second region R2 where elements constituting the second inverter part 60 of the substrate 341 are mounted. The motor line 145 is inserted into the motor line insertion hole 345, and is connected to the substrate 344 by solder etc.

The motor line insertion holes 344 and 345 are arranged on a circle C centering on the axial center O. That is, the motor lines 135 and 145 are arranged on the substrate 341 forming the circle C. According to the present embodiment, the motor lines 135 and 145 are taken out from the winding groups 13 and 14 which respectively have the winding wound on the stator 312. By arranging the motor line insertion holes 344 and 345 in a circle shape, the motor lines 135 and 145 extend substantially in a straight line shape from the stator 312 toward the substrate 341, the connection between the stator 312 and the substrate 341 is easily established.

The substrate 341 has a hole 348 at positions corresponding to each of the substrate bases 332. The substrate lockscrew 49 is inserted into the hole 348, and is screwed onto the substrate base 332 of the rear frame end 320. Thereby, the substrate 341 is fixed onto the rear frame end 320.

The substrate 341 has an arc part 351 disposed circularly and a connector base 352 disposed on the radial outside of the arc part 351. The connector base 352 has a hole 353 into which a connector lockscrew 389 is inserted.

The connector base 352 on the heat generation element mounting surface 342 of the substrate 341, which is positioned on an outside of the power relays 71, 72 and the reverse connection protection relays 73 and 74, has a connector 380 disposed thereon.

As shown in FIGS. 18-21, the connector 380 is fixed onto the substrate 341 by a connector lockscrew 389 inserted from the electronic component mounting surface 343 side of the substrate 341.

The connector 380 is made of resin or the like, is disposed to protrude from an outline of the substrate 341 radially-outwardly, and is positioned at the connector receiving part 336 of the rear frame end 320 facing the ECU 340. In such case, the connector 380 is closer to the ECU 340 than the frame part 322 and the connector receiving part 336 of the rear frame end 320, which corresponds to a recitation in the claim "the connector is positioned closer to the controller than the frame member."

The connector 380 has an opening 381 that faces in a radial outward direction, or faces in a radial direction away from the center axis O, for a connection to a harness from an outside. Further, the connector 380 has a terminal 382. The terminal 382 is connected to the substrate 341.

As for the connector 380 of the present embodiment, a power supply connector 383 and a signal connector 384 are combined to have one body. Further, on a periphery of the connector 380, a flange 385 is formed.

The connector 380 of the present embodiment is disposed at the radial outside of the capacitors 86 and 87 in the axial view of the drive unit 3. That is, when seen from the axial direction, the capacitor region in which the capacitors 86 and 87 are disposed and the connector region in which the connector 380 is disposed do not overlap. In such manner, the volume along the axis of the drive unit 3 is reduced in comparison to the one in which the two regions, i.e., the capacitor region and the connector region, overlap each other.

Further, according to the present embodiment, the connector 380 is disposed on the heat generation element mounting surface 342 of the substrate 341, and is arranged on the ECU 340 side of the connector receiving part 336. That is, the radiator region in which the radiator 330 is disposed and the connector region in which the connector 380 is disposed do not overlap in the axial view. In such manner, the volume along the axis of the drive unit 3 is reduced in comparison to the one in which the two regions, i.e., the radiator region and the connector region, overlap each other.

The cover member 390 is made from metal or the like, and is provided as a component having a separate body from the connector 380. The cover member 390 has a top part 391 and a side wall 392 disposed along a periphery of the top part 391 in a cover shape covering the ECU 340, and is fixed on the rear frame end 320 by calking etc.

A notch 393 is provided on the side wall 392 in a shape that fits to the connector 380. Thus, the opening 381 of the connector 380 is exposed from the cover member 390.

According to the present embodiment, based on an assumption that the drive unit 3 is installed with its motor 310 side down, i.e., on the lower side of the drive unit 3, the motor 310 side of the flange 385 is exposed from the cover member 390. By forming the flange 385, permeation of water from a gap between the cover member 390 and the connector 380 into an inside of the drive unit 3 is prevented. Further, water intruded inside of the drive unit 3 is drained from the flange 385 to an outside of the drive unit 3.

In the drive unit 3 of the present embodiment, the motor case is omitted, and the stator 312 corresponds to a "cylinder part of the rotating electric machine serving as the outline", and the heat generation element 70 and the capacitors 86 and 87 are arranged in the projection area of the stator 312 along the axis of the drive unit 3.

Further, the opening 381 of the connector 380 is formed to look radial outward of the drive unit 3. Therefore, the volume of the drive unit 3 along the axial direction is reduced.

As for the drive unit 3, the cover member 390 is provided to cover the ECU 340, i.e., to cover one side of the ECU 340 away from the motor 310, and the connector 380 is provided to have a separate body from the cover member 390.

By providing the connector 380 and the cover member 390 as two separate bodies, the structure and the arrangement of those components 380, 390 are more freely arrangeable.

Further, as shown in the present embodiment, the connector 380 is disposed on one side of the substrate 341, i.e., on the heat generation element mounting surface 342 side, the radiator 330 is arranged to stand, or to "rise up", toward the substrate 341 by the height/thickness of the connector 380, which is beneficial in terms of the amount of the heat dissipation surface and the heat dissipation direction the radiator 330, thereby enabling a highly-efficient heat dissipation therefrom.

Further, the same effect as the earlier-mentioned embodiment is also achieved.

Other Embodiments

Although the present disclosure has been described in connection with preferred embodiment thereof with reference to the accompanying FIG.s, it is to be noted that various changes and modifications will become apparent to those skilled in the art.

(a) Frame Member

According to the above-mentioned embodiment, the frame member is fixed to the motor case by using the frame lockscrew.

According to the other embodiments, the frame member may be fixed to the motor case by using components other than a screw.

Further, the frame member may be fixed to the motor case by press-fitting. Thereby, the number of components in the drive unit may be reduced. Also, the radius size of the drive unit may be reduced.

(b) ECU

According to the above-mentioned embodiment, the heat generation element contact the frame member via the heat dissipation gel.

According to the other embodiments, the heat dissipation gel may be replaced with a heat dissipation sheet, or the heat generation element may have a direct contact with the frame member.

According to the above-mentioned embodiment, the SW element has a heat dissipation slug exposed from the mold part.

According to the other embodiments, the SW element needs not have the heat dissipation slug exposed therefrom.

The same may apply to a power relay, a reverse connection protection relay, and an ASIC.

Further, in the above-mentioned embodiment, the driver element, the current detection element, the power relay, the reverse connection protection relay, and the ASIC correspond to the heat generation element, and the heat generation elements are enabled to dissipate heat from their backs to the frame element.

According to the other embodiments, the driver element, the power relay, the reverse connection protection relay, and a part of the ASIC may be mounted on the electronic component mounting surface, and a part of them may be omitted. Further, the current detection element may be implemented not as the shunt resistor but as the Hall IC etc., or may be provided only for two phases, i.e., may partially be omitted.

Still further, other electronic components other than the elements described above may also be mounted on the heat generation element mounting surface of the substrate for dissipating heat from their backs to the frame member. Still further, other electronic components other than the heat generation elements may also be mounted on the heat generation mounting surface.

According to the above-mentioned embodiment, the ECU has two pairs of the inverter part and the relay.

According to the other embodiments, the ECU has three pairs or more of the inverter part and the relay.

According to the above, the SW element of the first inverter part and the SW element of the second inverter part are arranged at axi-symmetric positions in the first embodiment, and the SW element of the first inverter part and the SW element of the second inverter part are arranged at point-symmetric positions in the fourth embodiment.

In the other embodiments, the SW elements in the first embodiment configuration may be arranged in point-symmetric, and the SW elements in the fourth embodiment configuration may be arranged in axi-symmetric.

Further, the arrangement of the SW elements may be other than the symmetric.

Further, the arrangement of the other electronic components on the substrate other than the SW elements may be arbitrarily performed.

According to the above-mentioned embodiment, the first system has the U, V, W phases arranged in order, i.e., neat to far, from the power relay, and the second system has the W, V, U phases arranged in order, i.e., neat to far, from the power relay.

In the other embodiments, the first system may have different phase arrangement, other than the U, V, W order arrangement from the power relay, and the second system preferably have the reverse order arrangement relative to the first system.

In such configuration, the reduction of the magnetic flux spill in the rotational angle sensor is achieved just like the above-mentioned embodiment. Further, the inter-phase/winding impedance variation may be reduced. Further, the arrangement order of the three phases needs not be reversed between the first system and the second system.

According to the above-mentioned embodiment, the ASIC, which is a component constituting the controller, is mounted on the heat generation element mounting surface, and the microcomputer is mounted on the electronic component mounting surface.

According to the other embodiments, the electronic components constituting the controller may be arbitrarily packaged, i.e., not necessarily be packaged as the ASIC nor the microcomputer. That is, the electronic components other than the microcomputer and the ASIC may be mounted on the arbitrary surface of the substrate.

Further, for example, the ASIC may be mounted on the electronic component mounting surface, and the microcomputer may be mounted on the heat generation element mounting surface. That is, the electronic components that are used for forming the controller may be mounted on any surface according to the package, i.e., according to the number of components in the package, a heat generation situation or the like. Further, the microcomputer may be mounted in an area that does not overlap with the ASIC.

According to the above embodiment, the capacitor, the choke coil, and the mechanical relay correspond to the "electronic component." According to the other embodiment, the other components other than the capacitor, the choke coil, and the mechanical relay, which are taller components taller than the heat generation element in terms of height on the substrate mounted on the electronic component mounting surface may also be considered as the "electronic components."

According to the first embodiment, the metal piece used for connection with the motor line is mounted on the substrate, and the substrate and the motor line are connected by press-fitting. According to the fourth embodiment, the substrate and the motor line are connected by soldering or the like.

According to the other embodiments, the substrate and the motor line may be connected with soldering in the first embodiment configuration, and the substrate and the motor line may be connected by press-fitting the metal piece provided on the substrate in the fourth embodiment configuration, for example. Further, the connection between the substrate and the motor line may be established not only by press-fitting or soldering but by any kind of connection method.

According to the above-mentioned embodiment, the substrate is fixed to the frame member by the substrate lockscrew.

According to the other embodiments, the substrate may be fixed to the frame member not only by the screw but by any other method.

(c) Connector

According to the first embodiment and the second embodiment, the connector comprises one power supply connector and two signal connectors.

According to the other embodiments, one or both of the power supply connector and the signal connector may be provided as multiple connectors. Further, the connectors may be provided in separate pieces as in the first/second embodiment, or may be provided in all-in-one form as in the fourth embodiment.

Further, when the motor case is not used as in the fourth embodiment, the stator may be used as a "cylinder part of the rotating electric machine," and the connector may be positioned within the projection area of the stator along the axial direction of the drive unit. Further, based on an assumption that the connector and the cover member are provided as separate pieces, the connector may be positioned on the surface of the substrate which faces away from the motor, i.e., on the electronic component mounting surface.

In other words, the number of connectors, the direction of the connector opening, the cover member formation (i.e., one body, or separate bodies, in terms of how the connector is formed) may be arbitrarily determined.

(d) Cover Member

According to the first embodiment and the second embodiment, the cover member is fixed to the frame member with adhesives. In the fourth embodiment, the cover member is caulked to the frame member.

The cover member may be fixed onto the frame member in any method other than the above. That is, the cover member may be fixed onto the frame member with the screw or the like, for example.

(e) Drive Unit

According to the above-mentioned embodiment, the rotating electric machine is a three phase brushless motor.

According to the other embodiments, the rotating electric machine may be any motor other than the three phase brushless motor.

Further, the rotating electric machine may not only be the motor (i.e., an electric motor) but a dynamo/generator, or may be a motor-generator that serves as a motor and a generator. Further, the winding may be provided not only in two systems, but also in three systems or more.

According to the above-mentioned embodiment, the drive unit is applied to the electric power steering device.

According to the other embodiments, the drive unit may be applied to devices other than the electric power steering device.

Such changes, modifications, and summarized schemes are to be understood as being within the scope of the present disclosure as defined by appended claims.

What is claimed is:

1. A drive unit comprising:
    a rotating electric machine having a stator that has a winding wound on the stator, a rotor rotatably disposed relative to the stator, and a shaft rotating together with the rotor;
    a frame member disposed on one axial end of the rotating electric machine; and
    a controller including
        a substrate attached on one surface of the frame member facing away from the rotating electric machine,
        a heat generation element disposed on a heat generation element mounting surface of the substrate, the heat generation element mounting surface facing the frame member, and
        an electronic component disposed on an electronic component mounting surface of the substrate, the electronic component mounting surface facing away from the frame member, and the electronic component being taller than the heat generation element in terms of height on the substrate, and
    the controller having the heat generation element and the electronic component arranged within a projection area of a cylinder part along an axial direction of the rotating electric machine, and the cylinder part serving as the outline of the rotating electric machine.

2. The drive unit of claim 1, wherein
the cylinder part includes a part of the motor case and the stator.

3. The drive unit of claim 1 further comprising:
a connector electrically connecting the controller and an external device, wherein
the electronic component includes a capacitor, and
the connector is positioned so that a silhouette of the connector in an axial projection parallel to the axial direction is prevent from overlapping with the capacitor and partially overlaps with the substrate.

4. The drive unit of claim 3, wherein
the connector is positioned at a radial outside of the capacitor.

5. The drive unit of claim 3, wherein
the connector is positioned within the projection area, and an opening of the connector faces away from the one surface of the frame member.

6. The drive unit of claim 3, wherein
an opening of the connector faces in a radial outward direction.

7. The drive unit of claim 3, wherein
the connector is disposed on one side of the substrate above the electronic component mounting surface, and is integrally formed with a cover member in one body, the cover member covering an away side of the controller facing away from the rotating electric machine.

8. The drive unit of claim 3, wherein
the connector is separately formed in an independent body being independent from a cover member covering an away side of the controller facing away from the rotating electric machine.

9. The drive unit of claim 1, wherein
the heat generation element includes a driver element that forms an inverter that switches a power supply for the winding.

10. The drive unit of claim 9, wherein
the heat generation element includes a relay that switches conduction and interception between the power supply and the inverter.

11. The drive unit of claim 9, wherein
the electronic component includes a mechanical relay that is disposed on the electronic component mounting surface to switch conduction and interception between the power supply and the inverter.

12. The drive unit of claim 1, wherein
the electronic component includes a coil member.

13. The drive unit of claim 1, wherein
the controller has a rotational angle sensor disposed on the heat generation element mounting surface at a position that faces the shaft, which enables a detection of a rotation of the shaft.

14. The drive unit of claim 1, wherein
the frame member has a magnet room disposed on the frame member to accommodate the magnet that is disposed on an end part of the shaft.

15. The drive unit of claim 1, wherein
the frame member has a bearing support part disposed on the frame member for rotatably supporting a bearing.

16. An electric power steering device comprising:
a rotating electric machine having a stator that has a winding wound on the stator, a rotor rotatably disposed relative to the stator, and a shaft rotating together with the rotor;
a frame member disposed on one axial end of the rotating electric machine; and
a controller including
    a substrate attached on one surface of the frame member facing away from the rotating electric machine,
    a heat generation element disposed on a heat generation element mounting surface of the substrate, the heat generation element mounting surface facing the frame member, and an electronic component disposed on an electronic component mounting surface of the substrate, the electronic component mounting surface facing away from the frame member, and the electronic component being taller than the heat generation element in terms of height on the substrate, and the controller having the heat generation element and the electronic component arranged within a projection area of a cylinder part along an axial direction of the rotating electric machine, and the cylinder part serving as the outline of the rotating electric machine; and a power transmission mechanism transmitting an output torque from the rotating electric machine to a drive object, wherein the torque output to drive the drive object assists a steering operation of a driver for steering a steering member.

* * * * *